(12) United States Patent
Fukuda

(10) Patent No.: US 12,507,973 B2
(45) Date of Patent: Dec. 30, 2025

(54) IMAGE PROCESSING APPARATUS, IMAGE PROCESSING METHOD, AND IMAGE PROCESSING PROGRAM

(71) Applicant: FUJIFILM Corporation, Tokyo (JP)

(72) Inventor: Wataru Fukuda, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 363 days.

(21) Appl. No.: 18/177,402

(22) Filed: Mar. 2, 2023

(65) Prior Publication Data

US 2023/0200770 A1 Jun. 29, 2023

Related U.S. Application Data

(63) Continuation of application No. PCT/JP2021/031597, filed on Aug. 27, 2021.

(30) Foreign Application Priority Data

Sep. 28, 2020 (JP) .................. 2020-162696

(51) Int. Cl.
*A61B 6/50* (2024.01)
*A61B 6/00* (2006.01)
(Continued)

(52) U.S. Cl.
CPC ............ *A61B 6/5217* (2013.01); *A61B 6/025* (2013.01); *A61B 6/463* (2013.01); *A61B 6/502* (2013.01);
(Continued)

(58) Field of Classification Search
CPC .................................. A61B 6/025; A61B 6/52
See application file for complete search history.

(56) References Cited

U.S. PATENT DOCUMENTS 5,459,769 A * 10/1995 Brown .................. A61B 6/488
378/4
5,671,743 A 9/1997 Kawai et al.
(Continued)

FOREIGN PATENT DOCUMENTS

DE 10 2011 087128 A1 5/2013
JP H08-308823 A 11/1996
(Continued)

OTHER PUBLICATIONS

Communication pursuant to Article 94(3) EPC issued by the European Patent Office on Aug. 19, 2024, which Corresponds to European Patent Application No. 21872089.4-1122 and is related to U.S. Appl. No. 18/177,402.
(Continued)

*Primary Examiner* — Joseph R Haley
(74) *Attorney, Agent, or Firm* — Studebaker Brackett PLLC

(57) ABSTRACT

An image processing apparatus including: at least one processor that is configured to: acquire a low-energy image captured by a radiography apparatus by emitting radiation having first energy to a subject into which a contrast medium has been injected, and a high-energy image captured by the radiography apparatus by emitting radiation having second energy higher than the first energy to the subject into which the contrast medium has been injected, generate a difference image showing a difference between the low-energy image and the high-energy image, perform image processing of enhancing the contrast medium shown in the difference image, and display a difference image after the image processing and contrast amount information about a contrast amount of a difference image before the image processing.

9 Claims, 15 Drawing Sheets

(51) Int. Cl.
- *A61B 6/02* (2006.01)
- *A61B 6/46* (2024.01)
- *G06T 5/50* (2006.01)
- *G06T 11/00* (2006.01)

(52) U.S. Cl.
CPC .......... *A61B 6/5205* (2013.01); *A61B 6/5229* (2013.01); *G06T 5/50* (2013.01); *G06T 11/005* (2013.01); *G06T 2207/10116* (2013.01); *G06T 2207/30068* (2013.01); *G06T 2210/41* (2013.01)

(56) References Cited

U.S. PATENT DOCUMENTS

| | | | |
|---|---|---|---|
| 2005/0084073 A1* | 4/2005 | Seppi | H01J 35/101 378/156 |
| 2005/0157916 A1 | 7/2005 | Sato | |
| 2013/0308847 A1 | 11/2013 | Schirra et al. | |
| 2014/0140604 A1 | 5/2014 | Carton et al. | |
| 2016/0073988 A1 | 3/2016 | Nagai | |
| 2016/0078621 A1 | 3/2016 | Nagae et al. | |
| 2016/0089090 A1* | 3/2016 | Nakayama | A61B 6/025 600/429 |
| 2017/0069085 A1* | 3/2017 | Sakamoto | G06T 7/0012 |
| 2017/0236276 A1 | 8/2017 | Fukuda et al. | |
| 2019/0096098 A1 | 3/2019 | Fukuda | |
| 2020/0146645 A1 | 5/2020 | Nakayama | |
| 2021/0183062 A1 | 6/2021 | Fukuda | |

FOREIGN PATENT DOCUMENTS

| | | |
|---|---|---|
| JP | H08-336517 A | 12/1996 |
| JP | 2003-224775 A | 8/2003 |
| JP | 2005-202675 A | 7/2005 |
| JP | 2014-503331 A | 2/2014 |
| JP | 2014-230589 A | 12/2014 |
| JP | 2015-091394 A | 5/2015 |
| JP | 2016-054999 A | 4/2016 |
| JP | 2017-143944 A | 8/2017 |
| WO | 2020/059306 A1 | 3/2020 |

OTHER PUBLICATIONS

An Office Action mailed by the Japanese Patent Office on May 28, 2024, which corresponds to Japanese Patent Application No. 2022-551223 and is related to U.S. Appl. No. 18/177,402; with English language translation.

International Search Report issued in PCT/JP2021/031597; mailed Nov. 16, 2021.

International Preliminary Report On Patentability (Chapter I) and Written Opinion of the International Searching Authority issued in PCT/JP2021/031597; issued Mar. 28, 2023.

An Office Action mailed by the Japan Patent Office on Oct. 15, 2024, which corresponds to Japanese Patent Application No. 2022-551223 and is related to U.S. Appl. No. 18/177,402; with English translation.

Communication pursuant to Article 94(3) EPC issued by the European Patent Office on Mar. 19, 2025, which corresponds to European Patent Application No. 21872089.4-1122 and is related to U.S. Appl. No. 18/177,402.

The extended European search report issued by the European Patent Office on Sep. 1, 2023, which corresponds to European Patent Application No. 21872089.4-1126 and is related to U.S. Appl. No. 18/177,402.

Communication pursuant to Article 94(3) EPC issued by the European Patent Office on Aug. 26, 2025, which corresponds to European Patent Application No. 21 872 089.4-1122 and is related to U.S. Appl. No. 18/177,402.

* cited by examiner

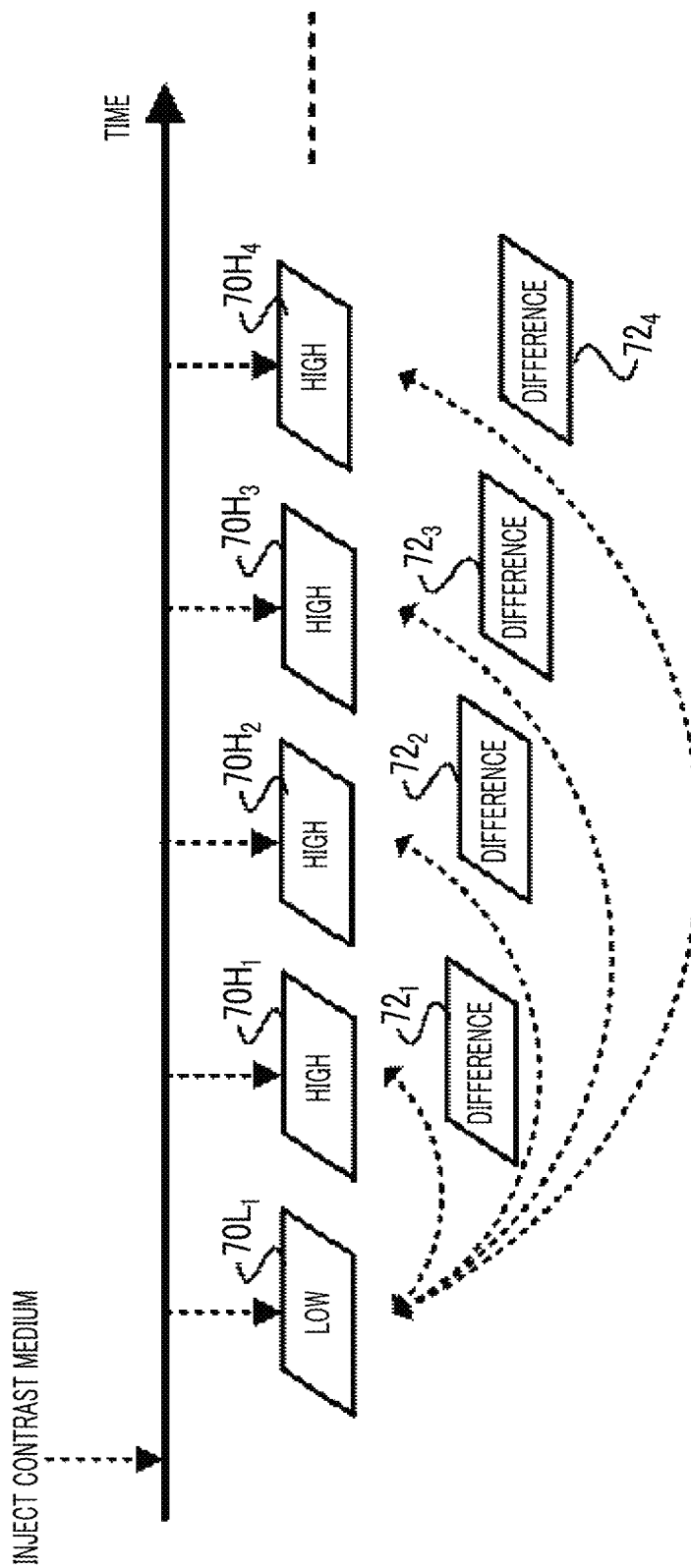

IMAGE PROCESSING APPARATUS, IMAGE PROCESSING METHOD, AND IMAGE PROCESSING PROGRAM

CROSS-REFERENCE TO RELATED APPLICATIONS

This application is a continuation application of International Application No. PCT/JP2021/031597, filed on Aug. 27, 2021, which is incorporated herein by reference in its entirety. Further, this application claims priority from Japanese Patent Application No. 2020-162696, filed on Sep. 28, 2020, the disclosure of which is incorporated by reference herein in their entirety.

BACKGROUND

Technical Field

The present disclosure relates to an image processing apparatus, an image processing method, and a non-transitory storage medium storing an image processing program.

Related Art

Contrast imaging of capturing a low-energy image and a high-energy image by irradiating a subject into which a contrast medium has been injected with radiation having different energies is performed to generate a difference image showing a difference between the high-energy image and the low-energy image. The difference image generated in this way is an image in which a body tissue of the subject is removed and the contrast medium is clearly reflected.

In addition, a technology of enhancing the difference image is known in order to facilitate observation of the contrast medium in the difference image. For example, JP2015-091394A discloses a technology of enhancing a contrast of a region of interest.

By the way, a pixel value of a pixel in the difference image corresponds to the contrast amount. However, in a case in which the contrast is enhanced by the image processing, the pixel value of the pixel in the difference image after the image processing may not correspond to the contrast amount. Therefore, it may be difficult to understand an actual contrast amount from the difference image after the image processing.

SUMMARY

The present disclosure is made in view of the above circumstances, and provides an image processing apparatus, an image processing method, and a non-transitory storage medium storing an image processing program capable of easily observing a contrast medium and easily evaluating a contrast amount.

A first aspect of the present disclosure relates to an image processing apparatus comprising at least one processor, in which the processor acquires a low-energy image captured by a radiography apparatus by emitting radiation having first energy to a subject into which a contrast medium has been injected, and a high-energy image captured by the radiography apparatus by emitting radiation having second energy higher than the first energy to the subject into which the contrast medium has been injected, generates a difference image showing a difference between the low-energy image and the high-energy image, performs image processing of enhancing the contrast medium shown in the difference image, and displays the difference image after the image processing and contrast amount information about a contrast amount of a difference image before the image processing.

A second aspect of the present disclosure relates to the image processing apparatus according to the first aspect, in which the contrast amount information is a numerical value indicating the contrast amount.

A third aspect of the present disclosure relates to the image processing apparatus according to the first aspect, in which the contrast amount information is a heat map of the contrast amount, and the processor displays the heat map in a manner being superimposed on the difference image after the image processing.

A fourth aspect of the present disclosure relates to the image processing apparatus according to the first aspect, in which the contrast amount information is the difference image before the image processing.

A fifth aspect of the present disclosure relates to the image processing apparatus according to any one of the first to fourth aspects, in which the processor derives the contrast amount information from the difference image before the image processing.

A sixth aspect of the present disclosure relates to the image processing apparatus according to any one of the first to fourth aspects, in which the processor derives the contrast amount information by excluding an influence of the image processing from information about a contrast amount derived from the difference image after the image processing.

A seventh aspect of the present disclosure relates to the image processing apparatus according to any one of the first to sixth aspects, in which the processor causes the radiography apparatus to capture a plurality of the high-energy images to acquire the plurality of captured high-energy images, and generates the difference image for each of the plurality of high-energy images.

An eighth aspect of the present disclosure relates to the image processing apparatus according to any one of the first to sixth aspects, in which the radiography apparatus is able to perform tomosynthesis imaging of emitting radiation from each of a plurality of different irradiation angles to the subject to capture the low-energy image and the high-energy image for each of the plurality of irradiation angles, and the processor generates, as the difference image, a difference image showing a difference between a low-energy tomographic image generated by reconstructing a plurality of the low-energy images and a high-energy tomographic image generated by reconstructing a plurality of the high-energy images.

A ninth aspect of the present disclosure relates to the image processing apparatus according to any one of the first to sixth aspects, in which the radiography apparatus is able to perform tomosynthesis imaging of emitting radiation from each of a plurality of different irradiation angles to the subject to capture, as a pair of projection images, the low-energy image and the high-energy image for each of the plurality of irradiation angles, and the processor generates a projection difference image showing a difference between the pair of projection images for each irradiation angle, and generates, as the difference image, a tomographic image generated by reconstructing a plurality of the generated projection difference images.

A tenth aspect of the present disclosure relates to the image processing apparatus according to the eighth or ninth aspect, in which the processor derives, from the tomographic image, a length of a region of interest in a transmission direction in which the radiation is transmitted, and derives, as the contrast amount information, a density of a contrast medium in the region of interest based on the derived length of the region of interest.

An eleventh aspect of the present disclosure relates to the image processing apparatus according to any one of the first to tenth aspects, in which the subject is a breast, and the radiography apparatus is a mammography apparatus.

A twelfth aspect of the present disclosure relates to an image processing method executed by a computer, the method comprising acquiring a low-energy image captured by a radiography apparatus by emitting radiation having first energy to a subject into which a contrast medium has been injected, and a high-energy image captured by the radiography apparatus by emitting radiation having second energy higher than the first energy to the subject into which the contrast medium has been injected, generating a difference image showing a difference between the low-energy image and the high-energy image, performing image processing of enhancing the contrast medium shown in the difference image, and displaying the difference image after the image processing and contrast amount information about a contrast amount of a difference image before the image processing.

In addition, a thirteenth aspect of the present disclosure relates to a non-transitory storage medium storing a program causing a computer to execute an image processing, the image processing comprising: acquiring a low-energy image captured by a radiography apparatus by emitting radiation having first energy to a subject into which a contrast medium has been injected, and a high-energy image captured by the radiography apparatus by emitting radiation having second energy higher than the first energy to the subject into which the contrast medium has been injected, generating a difference image showing a difference between the low-energy image and the high-energy image, performing image processing of enhancing the contrast medium shown in the difference image, and displaying the difference image after the image processing and contrast amount information about a contrast amount of a difference image before the image processing.

According to the present disclosure, the contrast medium can be easily observed and the contrast amount can be easily evaluated.

BRIEF DESCRIPTION OF THE DRAWINGS

FIG. 7A is a diagram showing an example of a generation method of a difference image in the time series imaging.

DETAILED DESCRIPTION

In the following, an embodiment of the present invention will be described in detail with reference to the drawings. It should be noted that the present embodiment does not limit the present invention.

Figure 1:
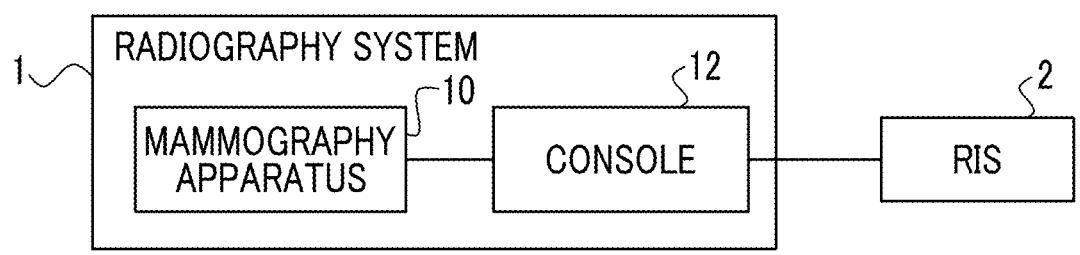
FIG. 1 is a configuration diagram schematically showing an example of an overall configuration of a radiography system according to an embodiment.

First, an example of an overall configuration of a radiography system according to the present embodiment will be described. FIG. 1 shows a configuration diagram showing an example of an overall configuration of a radiography system 1 according to the present embodiment. As shown in FIG. 1, the radiography system 1 according to the present embodiment comprises a mammography apparatus 10 and a console 12. The mammography apparatus 10 according to the present embodiment is an example of a radiography apparatus according to the present disclosure. In addition, the console 12 according to the present embodiment is an example of an image processing apparatus according to the present disclosure.

Figure 2A:
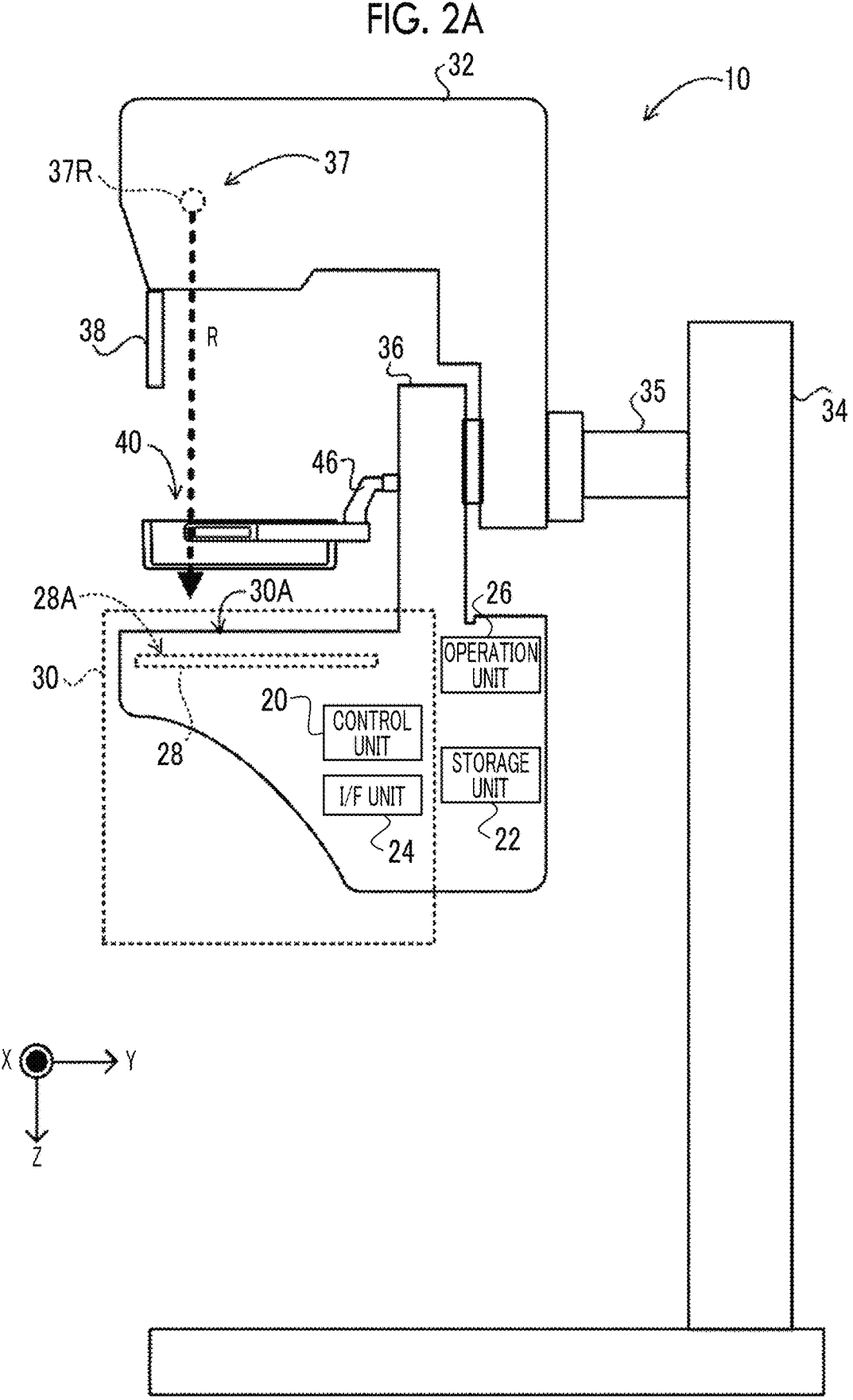
FIG. 2A is a side view showing an example of an appearance of a mammography apparatus according to the embodiment.

First, the mammography apparatus 10 according to the present embodiment will be described. FIG. 2A shows a side view showing an example of an appearance of the mammography apparatus 10 according to the present embodiment. It should be noted that FIG. 2A shows the example of the appearance of the mammography apparatus 10 as viewed from a right side of an examinee.

The mammography apparatus 10 according to the present embodiment is an apparatus that uses a breast of the examinee as a subject and captures a radiation image of the breast by irradiating the breast with radiation R (for example, X-rays). It should be noted that the mammography apparatus 10 may be an apparatus that images the breast of the examinee in a state in which the examinee is sitting on a chair (including a wheelchair) or the like (sitting state) in addition to a state in which the examinee is standing (standing state).

In addition, the mammography apparatus 10 according to the present embodiment has a function of performing two types of imaging of so-called contrast imaging in which the imaging is performed in a state in which a contrast medium has been injected into the breast of the examinee and general imaging. It should be noted that, in the present embodiment, the imaging to be performed in a state in which the contrast medium has been injected into the breast of the examinee refers to the "contrast imaging", and the imaging that is not the contrast imaging refers to the "general imaging". In addition, the mammography apparatus 10 according to the present embodiment has a function of performing normal imaging of performing imaging with a radiation source as an irradiation position along a normal direction of a detection surface 28A of a radiation detector, and so-called tomosynthesis imaging of performing imaging by moving a radiation source 37R to each of a plurality of irradiation positions. It should be noted that, in the mammography apparatus 10, both the contrast imaging and the general imaging are possible in both the normal imaging and the tomosynthesis imaging.

As shown in FIG. 2A, the mammography apparatus 10 according to the present embodiment comprises a control unit 20, a storage unit 22, and an interface (I/F) unit 24 inside the imaging table 30. The control unit 20 controls an overall operation of the mammography apparatus 10 under the control of the console 12. The control unit 20 comprises a central processing unit (CPU), a read only memory (ROM), and a random access memory (RAM) (all not shown). The ROM stores, in advance, various programs, including an imaging processing program for performing control related to radiation image capturing, which is executed by the CPU. The RAM transitorily stores various data.

The storage unit 22 stores the image data of the radiation image captured by the radiation detector 28 or various types of other information. Specific examples of the storage unit 22 include a hard disk drive (HDD) and a solid state drive (SDS). The I/F unit 24 performs communication of various types of information with the console 12 by wireless communication or wired communication. The image data of the radiation image captured by the radiation detector 28 in the mammography apparatus 10 is transmitted to the console 12 via the I/F unit 24 by wireless communication or wired communication.

In addition, an operation unit 26 is provided as a plurality of switches on an imaging table 30 of the mammography apparatus 10, for example. It should be noted that the operation unit 26 may be provided as a touch panel type switch, or may be provided as a foot switch operated by a user, such as a doctor or an engineer with a foot.

The radiation detector 28 detects the radiation R that has passed through the breast which is the subject. In addition, as shown in FIG. 2A, the radiation detector 28 is disposed inside the imaging table 30. In the mammography apparatus 10 according to the present embodiment, the user positions the breast of the examinee on an imaging surface 30A of the imaging table 30 in a case of performing the imaging.

The radiation detector 28 detects the radiation R transmitted through the breast of the examinee and the imaging table 30, generates a radiation image based on the detected radiation R, and outputs image data representing the generated radiation image. A type of the radiation detector 28 according to the present embodiment is not particularly limited. For example, a radiation detector of an indirect conversion method that converts the radiation R into light and converts the converted light into a charge may be used, and a radiation detector of a direct conversion method that directly converts the radiation R into a charge may be used.

A radiation emitting unit 37 comprises the radiation source 37R. As shown in FIG. 2A, the radiation emitting unit 37 is provided in an arm part 32 together with the imaging table 30 and the compression unit 36. As shown in FIG. 2A, a face guard 38 is attachably and detachably provided at a position near the examinee on the arm part 32 below the radiation emitting unit 37. The face guard 38 is a protective member for protecting the examinee from the radiation R emitted from the radiation source 37R.

It should be noted that, as shown in FIG. 2A, the mammography apparatus 10 according to the present embodiment comprises the arm part 32, a base 34, and a shaft part 35. The arm part 32 is held by the base 34 to be movable in a vertical direction (Z-axis direction). In addition, the arm part 32 can be rotated with respect to the base 34 by the shaft part 35. The shaft part 35 is fixed to the base 34, and the shaft part 35 and the arm part 32 are integrally rotated.

A gear is provided for each of the shaft part 35 and the compression unit 36. By switching between an engaged state and a non-engaged state of the gears, a state in which the compression unit 36 and the shaft part 35 are connected and are integrally rotated and a state in which the shaft part 35 is separated from the compression unit 36 and the imaging table 30 and is idled can be switched. It should be noted that, for switching between transmission and non-transmission of power of the shaft part 35, various mechanical elements can be used in addition to the gear described above.

The arm part 32, the imaging table 30, and the compression unit 36 can be separately rotated relative to the base 34 with the shaft part 35 as a rotation axis. In the present embodiment, the base 34, the arm part 32, the imaging table 30, and the compression unit 36 are each provided with an engaging part (not shown), and each of the arm part 32, the imaging table 30, and the compression unit 36 is connected to the base 34 by switching a state of the engaging part. One or two of the arm part 32, the imaging table 30, or the compression unit 36, which are connected to the shaft part 35, are integrally rotated around the shaft part 35.

The compression unit 36 is provided with a compression plate driving unit (not shown) that moves the compression plate 40 in the vertical direction (Z-axis direction). The compression plate 40 according to the present embodiment has a function of compressing the breast of the examinee. A support part 46 of the compression plate 40 is attachably and detachably attached to the compression plate driving unit, is moved in the vertical direction (Z-axis direction) by the compression plate driving unit, and compresses the breast of the examinee with the imaging table 30.

Figure 2B:
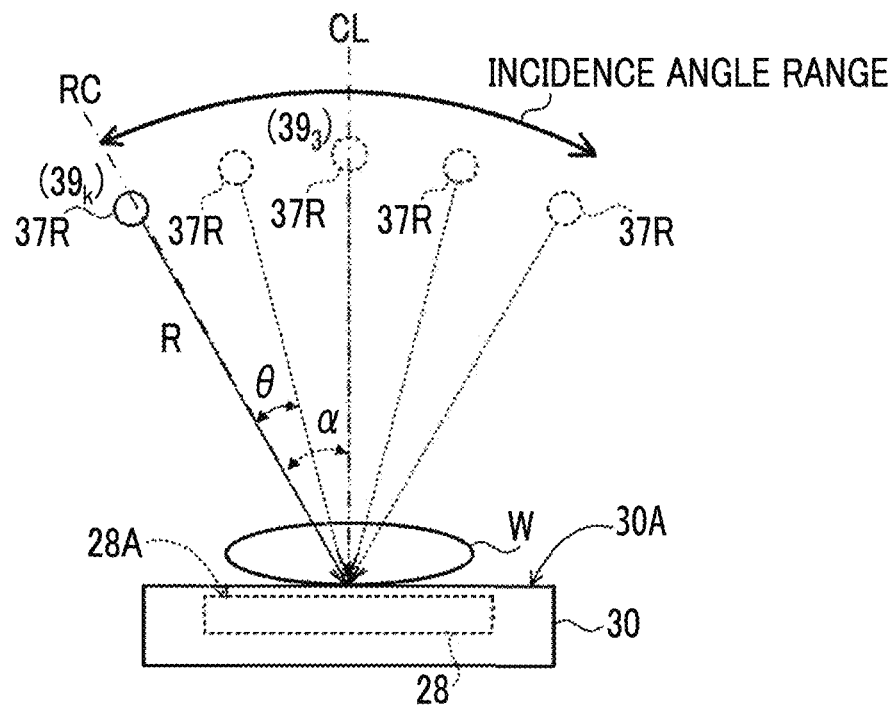
FIG. 2B is a diagram showing an example of tomosynthesis imaging.

In a case in which the tomosynthesis imaging is performed in the mammography apparatus 10, the radiation source 37R of the radiation emitting unit 37 is continuously moved to each of a plurality of irradiation positions with different irradiation angles due to the rotation of the arm part 32. FIG. 2B is a diagram showing an example of the tomosynthesis imaging. It should be noted that, in FIG. 2B, the compression plate 40 is not shown. In the present embodiment, as shown in FIG. 2B, the radiation source 37R is moved to the irradiation position $39_k$ (k=0, 1, K, and K=5 in FIG. 2B) at which the irradiation angles differ by each predetermined angle θ, in other words, a position at which the incidence angles of the radiation R with respect to the detection surface 28A of the radiation detector 28 are different. At each irradiation position $39_k$, the radiation R is emitted from the radiation source 37R toward the breast W according to the instruction of the console 12, and the radiation image is captured by the radiation detector 28. It should be noted that, hereinafter, in the tomosynthesis imaging, the radiation image captured by the radiation detector 28 at a plurality of irradiation positions $39_k$ at different irradiation angles will be referred to as a "projection image". In the radiography system 1, in a case in which the tomosynthesis imaging is performed by moving the radiation source 37R to each irradiation position $39_k$ to capture the projection image at each irradiation position $39_k$, K projection images are obtained. It should be noted that, hereinafter, in a case in which a plurality of types of radiation images, such as the projection image, a low-energy image, or a high-energy image, which will be described below, are collectively referred to, the radiation images are simply referred to as a "radiation image".

It should be noted that, as shown in FIG. 2B, the incidence angle of the radiation R refers to an angle α formed by the normal line CL of the detection surface 28A of the radiation detector 28, and the radiation axis RC. In addition, here, the detection surface 28A of the radiation detector 28 is a substantially parallel surface to an imaging surface 30A. Hereinafter, as shown in FIG. 2B, a predetermined range in which the incidence angles differ in the tomosynthesis imaging is referred to as an "incidence angle range". Specific examples of the incidence angle range include a range of ±10 degrees or ±20 degrees with respect to the normal line CL of the detection surface 28A of the radiation detector 28. It should be noted that, in the present embodiment, the "incidence angle" and the "irradiation angle" have the same meaning for the radiation R.

On the other hand, in a case of performing the normal imaging in the mammography apparatus 10, the radiation source 37R of the radiation emitting unit 37 is maintained at the irradiation position $39_k$ at which the irradiation angle α is 0 degrees (irradiation position $39_k$ along the normal direction, an irradiation position $39_3$ in FIG. 2B). The radiation R is emitted from the radiation source 37R according to the instruction of the console 12, and the radiation image is captured by the radiation detector 28.

On the other hand, the console 12 according to the present embodiment has a function of controlling the mammography apparatus 10 by using an imaging order and various types of information acquired from a radiology information system (RIS) 2 via a wireless communication local area network (LAN) and the like, and an instruction performed by the user by an operation unit 56 and the like.

Figure 3:
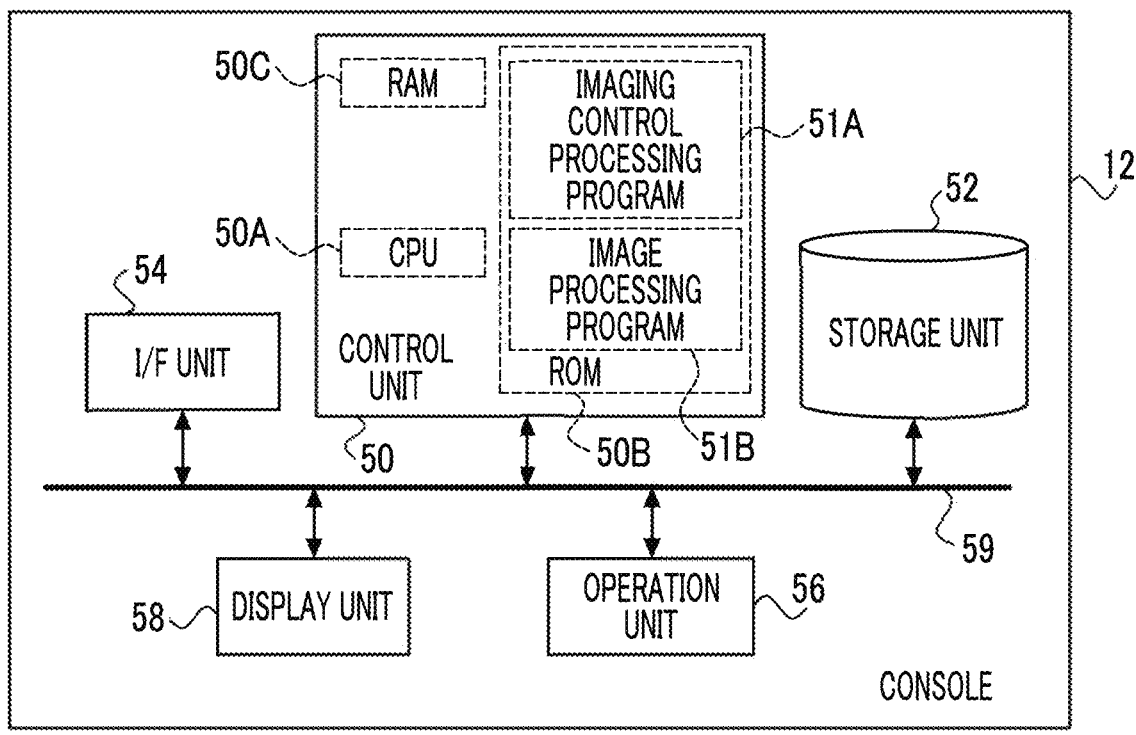
FIG. 3 is a block diagram showing an example of a configuration of a console according to the embodiment.

The console 12 according to the present embodiment is, for example, a server computer. As shown in FIG. 3, the console 12 comprises a control unit 50, a storage unit 52, an I/F unit 54, the operation unit 56, and a display unit 58. The control unit 50, the storage unit 52, the I/F unit 54, the operation unit 56, and the display unit 58 are connected to each other via a bus 59, such as a system bus or a control bus, such that various types of information can be exchanged.

The control unit 50 according to the present embodiment controls an overall operation of the console 12. The control unit 50 comprises a CPU 50A, a ROM 50B, and a RAM 50C. The ROM 50B stores, in advance, various programs including an imaging control processing program 51A and an image processing program 51B, which are executed by the CPU 50A and will be described below. The RAM 50C transitorily stores various data. The CPU 50A according to the present embodiment is an example of a processor according to the present disclosure. The image processing program 51B according to the present embodiment is an example of an image processing program according to the present disclosure.

The storage unit 52 stores the image data of the radiation image captured by the mammography apparatus 10 or various types of other information. Specific examples of the storage unit 52 include an HDD and an SSD.

The operation unit 56 is used by the user to input the instruction, various types of information, and the like related to the radiation image capturing and the like, including an irradiation instruction of the radiation R. The operation unit 56 is not particularly limited, and examples thereof include various switches, a touch panel, a touch pen, and a mouse. The display unit 58 displays various types of information. It should be noted that the operation unit 56 and the display unit 58 may be integrated to form a touch panel display.

The I/F unit 54 performs communication of various types of information between the mammography apparatus 10 and the RIS 2 by wireless communication or wired communication. The console 12 according to the present embodiment receives the image data of the radiation image captured by the mammography apparatus 10 from the mammography apparatus 10 via the I/F unit 54 by wireless communication or wired communication.

Figure 4:
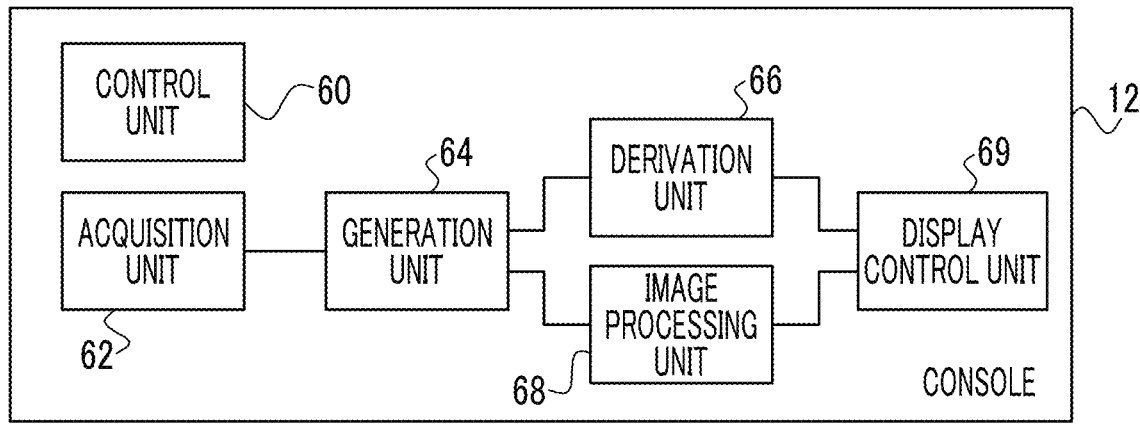
FIG. 4 is a functional block diagram showing an example of a function of the console according to the embodiment.

Further, FIG. 4 shows a functional block diagram of an example of the configuration of the console 12 according to the present embodiment. As shown in FIG. 4, the console 12 comprises a control unit 60. As an example, in the console 12 according to the present embodiment, the CPU 50A of the control unit 50 functions as the control unit 60 by the CPU 50A executing the imaging control processing program 51A stored in the ROM 50B.

The control unit 60 has a function of controlling the contrast imaging, and specifically, has a function of performing control related to the irradiation with the radiation R in the contrast imaging by the mammography apparatus 10. In the present embodiment, in a case of performing the contrast imaging, the radiation image is captured by emitting the radiation having the first energy from the radiation source 37R to the breast in a state in which the contrast medium has been injected. In addition, the radiation image is captured by emitting the radiation having the second energy higher than the first energy from the radiation source 37R to the breast in a state in which the contrast medium has been injected. It should be noted that, in the present embodiment, the radiation image captured by emitting the radiation R having the first energy is referred to as a "low-energy image", and the radiation image captured by emitting the radiation R having the second energy is referred to as a "high-energy image".

For example, an iodine contrast medium with a k-absorption edge of 32 keV is generally used as the contrast medium for the contrast imaging. In the contrast imaging in this case, the low-energy image is captured by emitting the radiation R having the first energy lower than the k-absorption edge of the iodine contrast medium. In addition, the high-energy image is captured by emitting the radiation R having the second energy higher than the k-absorption edge of the iodine contrast medium.

Therefore, in the contrast imaging, the control unit 60 according to the present embodiment performs control of emitting the radiation R having the first energy from the radiation source 37R and control of emitting the radiation R having the second energy. In other words, the control unit 60 performs control of causing the mammography apparatus 10 to capture the low-energy image and control of causing the mammography apparatus 10 to capture the high-energy image.

A body tissue, such as a mammary gland, and the contrast medium have different absorption characteristics of the radiation. Therefore, in the high-energy image captured as described above, the body tissue, such as the mammary gland or fat, is reflected, and the contrast medium is clearly reflected. In addition, in the low-energy image, almost no contrast medium is reflected, and the body tissue, such as the mammary gland, is clearly reflected. Therefore, the difference image showing a difference between the low-energy image and the high-energy image can be made to be an image in which a mammary gland structure is removed and the contrast medium is clearly reflected.

In addition, in the contrast imaging by the mammography apparatus 10 according to the present embodiment, as described above, any of the normal imaging or the tomosynthesis imaging is performed. In addition, there are two types of the normal imaging in the contrast imaging, that is, single-shot imaging and time series imaging. In the single-shot imaging, each of the low-energy image and the high-energy image is captured only once.

On the other hand, in the time series imaging, each of the low-energy image and a plurality of high-energy images is captured to capture a change of a state in which the contrast medium permeates the breast in time series. For example, the contrast medium tends to more easily permeate in a lesion, such as a tumor, than the mammary gland. Also, as the lesion is more malignant, the contrast medium tends to permeate faster and the contrast medium tends to be washed out faster. Therefore, by using a plurality of difference images obtained in time series by performing the time series imaging, a temporal change or an amount of permeation (contrast amount) of the contrast medium permeating a region of interest, such as the lesion, can be observed.

In order to obtain the plurality of difference images, in the present embodiment, after the low-energy image is captured, the high-energy image is captured each time a predetermined time, such as 1 second, elapses. As described above, in order to observe the temporal change of the contrast amount of the region of interest, it is necessary to capture the high-energy image in which the contrast medium is clearly reflected, according to the temporal change. On the other hand, in a case in which the body movement is not taken into consideration, the low-energy image does not need to be captured as frequently as the high-energy image because the temporal change of the state of the mammary gland structure, particularly, the temporal change of the imaging time of the contrast imaging is very small. Therefore, in the time series imaging by the mammography apparatus 10 according to the present embodiment, the number of times of capturing of the low-energy image is set to one. It should be noted that the state of the mammary gland structure may be changed due to the body movement of the examinee, the low-energy image may be captured a plurality of times.

Figure 5:
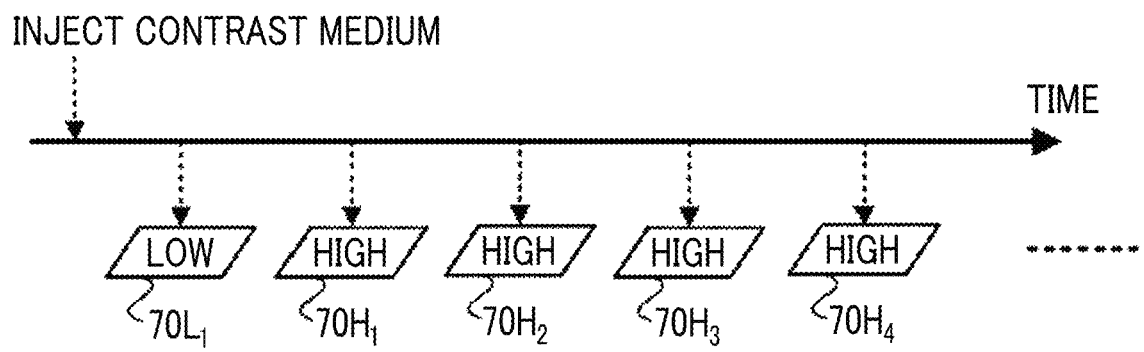
FIG. 5 is a time chart showing an example of imaging timings of a low-energy image and a high-energy image in contrast imaging and time series imaging using the mammography apparatus according to the embodiment.

FIG. 5 shows an example of imaging timings of the low-energy image 70L and the high-energy image 70H in the contrast imaging and the time series imaging. In the example shown in FIG. 5, in a case in which the contrast imaging is started, first, a low-energy image 70L (see FIG. 5, $70L_1$) is captured, and then high-energy images 70H (see FIG. 5, $70H_1$ to $70H_4$) are repeatedly captured each time the predetermined time elapses, until a contrast imaging time ends. As described above, in a case of the contrast imaging and the time series imaging, the mammography apparatus 10 according to the present embodiment captures one low-energy image 70L and a plurality of high-energy images 70H.

In addition, in a case of the contrast imaging and the tomosynthesis imaging in the mammography apparatus 10 according to the present embodiment, the low-energy image and the high-energy image are captured as the projection images for each irradiation position $39_k$ of the radiation R. Hereinafter, in a case in which the low-energy image, which is the projection image, is distinguished from the low-energy image captured in another imaging, the low-energy image is referred to as a "low-energy projection image". Similarly, in a case in which the high-energy image, which is the projection image, is distinguished from the high-energy image captured in another imaging, the high-energy image is referred to as a "high-energy projection image".

Figure 6:
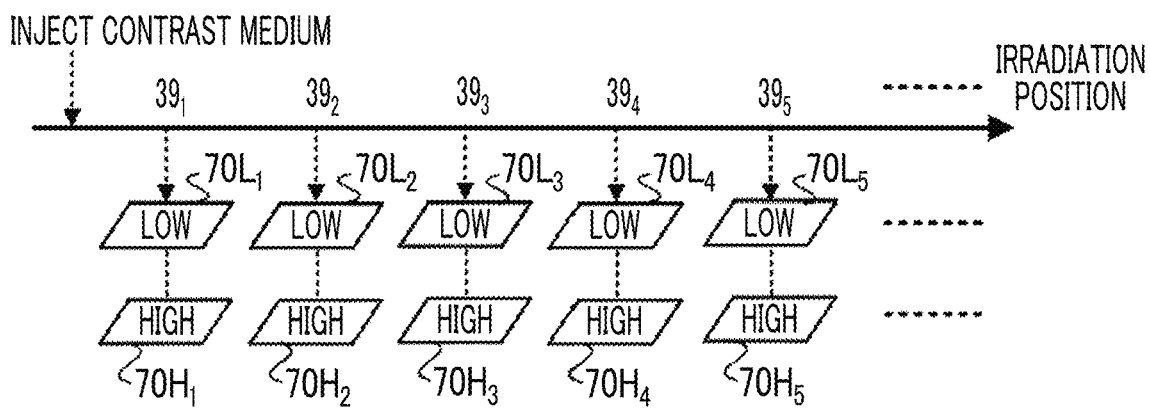
FIG. 6 is a time chart showing an example of imaging timings of a low-energy image and a high-energy image in contrast imaging and tomosynthesis imaging using the mammography apparatus according to the embodiment.

FIG. 6 shows an example of imaging timings of the low-energy projection image 71L and the high-energy projection image 71H in the contrast imaging and the tomosynthesis imaging. In the example shown in FIG. 6, the low-energy projection image 71L (see FIG. 6, $71L_1$ to $71L_5$) and the high-energy projection image 71H (see FIG. 6, $71H_1$ to $71H_5$) are captured as the projection image for each irradiation position $39_k$. As described above, in a case of the contrast imaging and the tomosynthesis imaging, the mammography apparatus 10 according to the present embodiment captures the same number of low-energy projection images 71L and high-energy projection images 71H as the number of irradiation positions $39_k$.

In addition, the console 12 according to the present embodiment comprises an acquisition unit 62, a generation unit 64, a derivation unit 66, an image processing unit 68, and a display control unit 69. As an example, in the console 12 according to the present embodiment, the CPU 50A of the control unit 50 also functions as the acquisition unit 62, the generation unit 64, the derivation unit 66, the image processing unit 68, and the display control unit 69 by the CPU 50A executing the image processing program 51B stored in the ROM 50B.

The acquisition unit 62 has a function of acquiring the low-energy image and the high-energy image captured by the mammography apparatus 10. Specifically, the acquisition unit 62 acquires image data representing the low-energy image and image data representing the high-energy image captured by the radiation detector 28 of the mammography apparatus 10 via the I/F unit 24 and the I/F unit 54. The acquisition unit 62 outputs the acquired low-energy image and high-energy image to the generation unit 64.

In a case of the single-shot imaging, the acquisition unit 62 acquires one low-energy image and one high-energy image. In addition, in a case of the time series imaging, the acquisition unit 62 acquires one low-energy image and a plurality of high-energy images. In addition, in a case of the tomosynthesis imaging, the acquisition unit 62 acquires a plurality of low-energy images, which are projection images, and a plurality of high-energy images, which are projection images.

The generation unit 64 has a function of generating a plurality of difference images showing a difference between the low-energy image and each of a plurality of high-energy images. In a case of the single-shot imaging, the generation unit 64 generates the difference image between one low-energy image and one high-energy image. Therefore, in a case of the single-shot imaging, the generation unit 64 generates one difference image.

As an example, in the present embodiment, the difference image is generated by deriving the difference between the low-energy image and each high-energy image. Specifically, the generation unit 64 generates the difference image data representing the difference image in which the mammary gland tissue is removed and the contrast medium is clearly reflected, by subtracting image data obtained by multiplying the low-energy image 70L by a predetermined coefficient from image data obtained by multiplying the high-energy image 70H by a predetermined coefficient for each corresponding pixel. In a case of the single-shot imaging, the generation unit 64 outputs image data representing the generated difference image to the derivation unit 66 and the image processing unit 68.

In addition, in a case of the time series imaging, the generation unit 64 generates the difference image between one low-energy image and each of the plurality of high-energy images. As an example, in the present embodiment, as shown in FIG. 7A, the generation unit 64 generates a difference image $72_1$ between the low-energy image $70L_1$ and the high-energy image $70H_1$, as in a case of the single-shot imaging. In addition, the generation unit 64 generates a difference image $72_2$ between the low-energy image $70L_1$ and the high-energy image $70H_2$, generates a difference image $72_3$ between the low-energy image $70L_1$ and the high-energy image $70H_3$, and generates a difference image $72_4$ between the low-energy image $70L_1$ and the high-energy image $70H_4$. As described above, in a case of the time series imaging, the generation unit 64 generates the same number of difference images as the number of high-energy images. In a case of the time series imaging, the generation unit 64 outputs image data representing the generated difference image to the derivation unit 66 and the image processing unit 68.

Figure 7B:
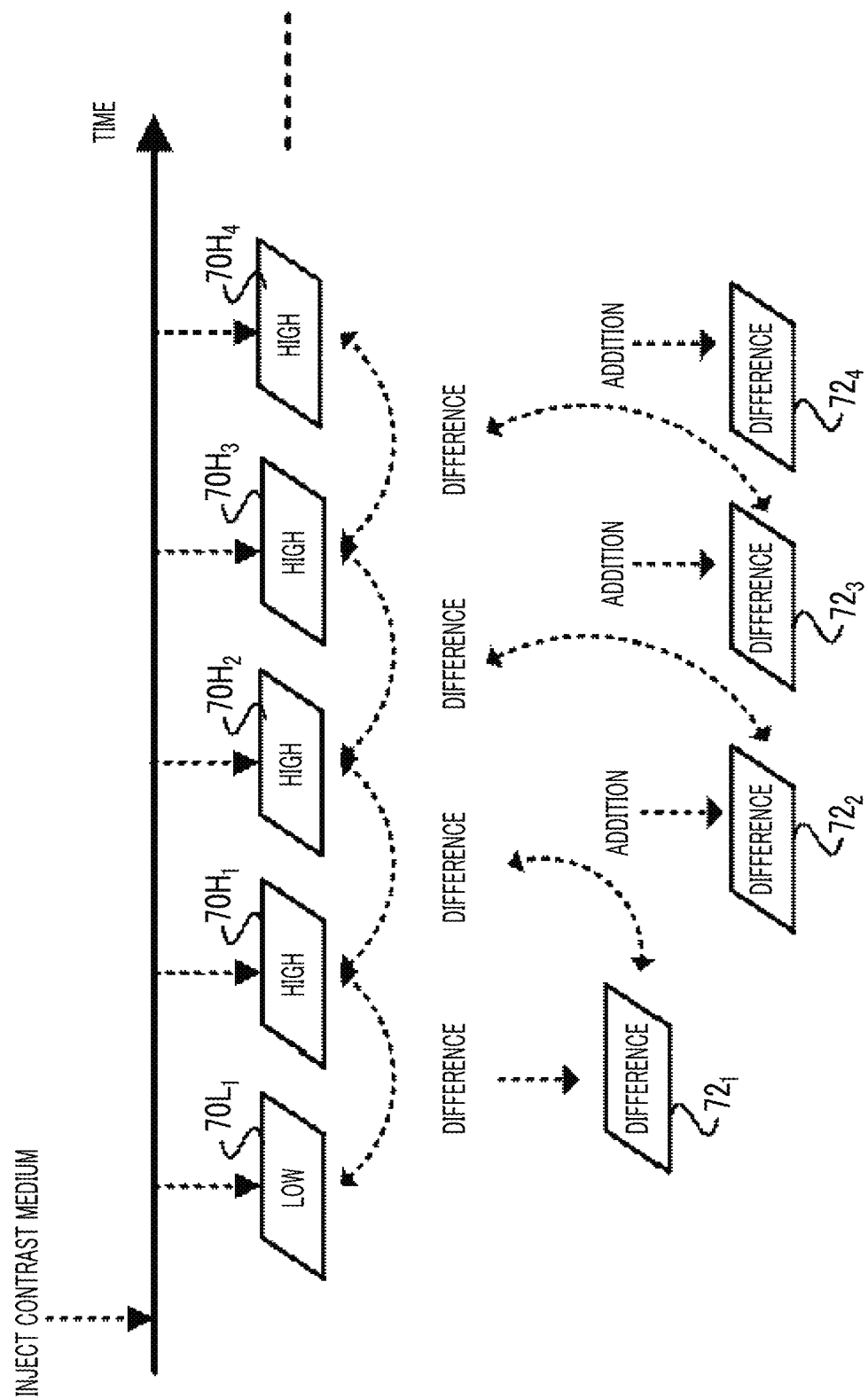
FIG. 7B is a diagram showing another example of the generation method of the difference image in the time series imaging.

It should be noted that a method by which the generation unit 64 generates the difference image is not limited to the method described above. For example, the difference image may be generated by adding a difference between the high-energy images to the difference between the low-energy image and the high-energy image. Specifically, as shown in FIG. 7B, as described above, the generation unit 64 generates the difference image $72_1$ between the low-energy image $70L_1$ and the high-energy image $70H_1$. In addition, the generation unit 64 generates the difference image $72_2$ by adding an image showing a difference between the high-energy image $70H_2$ and the high-energy image $70H_1$ to the difference image $72_1$, generates the difference image $72_3$ by adding an image showing a difference between the high-energy image $70H_3$ and the high-energy image $70H_2$ to the difference image $72_2$, and generates the difference image $72_4$ by adding an image showing a difference between the high-energy image $70H_4$ and the high-energy image $70H_3$ to the difference image $72_3$.

Figure 8:
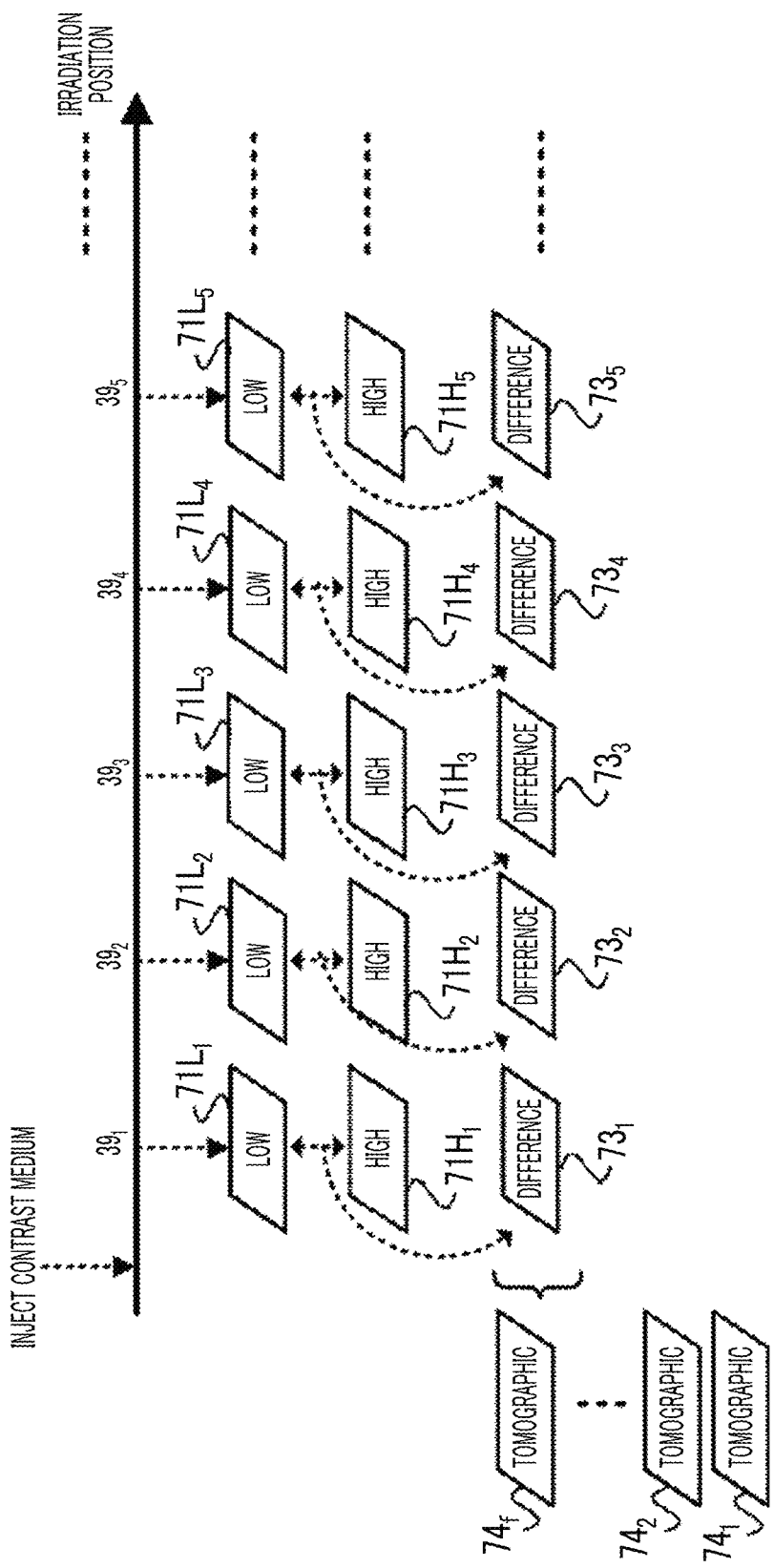
FIG. 8 is a diagram showing an example of a generation method of a difference image and a tomographic image in the tomosynthesis imaging.

In addition, in a case of the tomosynthesis imaging, the generation unit 64 generates the difference image for each projection image. That is, the difference image between the low-energy projection image and the high-energy projection image is generated for each irradiation position $39_k$. As an example, in the present embodiment, as shown in FIG. 8, the generation unit 64 generates a difference image 731 between the low-energy projection image $71L_1$ and the high-energy projection image $71H_1$ at an irradiation position 391, as in a case of the single-shot imaging. In addition, the generation unit 64 generates a difference image $73_2$ between the low-energy projection image $71L_2$ and the high-energy projection image $71H_2$, generates a difference image $73_3$ between the low-energy projection image $71L_3$ and the high-energy projection image $71H_3$, and generates a difference image $73_4$ between the low-energy projection image $71L_4$ and the high-energy projection image $71H_4$. In addition, the generation unit 64 generates a difference image $73_5$ between the low-energy projection image $71L_5$ and the high-energy projection image $71H_5$. Therefore, in a case of the tomosynthesis imaging, the generation unit 64 generates the same number of difference images 73 as the number of irradiation positions $39_k$. The generated difference image 73 corresponds to the projection image. The difference image 73 according to the present embodiment is an example of a projection difference image according to the present disclosure.

Further, in a case of the tomosynthesis imaging, the generation unit 64 reconstructs the series of generated difference images 73 to generate the series of tomographic images 74 having a predetermined slice thickness. FIG. 8 shows a form in which f tomographic images (tomographic images $74_1$ to $74_f$) are generated from the series of difference images 73. It should be noted that a method by which the generation unit 64 generates the tomographic image 74 is not particularly limited. For example, the reconstruction may be performed by a back projection method, such as a filter back projection (FBP) method or a successive approximation reconstruction method, and a known technology can be applied. In addition, the slice thickness of the tomographic image 74 to be generated is not particularly limited, and can be determined according to, for example, a size of an object of interest, an image quality of the radiation image, a processing load of arithmetic processing in the generation, an instruction from the user, and the like. The tomographic image 74 generated by the generation unit 64 in this way corresponds to the difference image, and can be made to be an image in which the mammary gland structure is removed and the contrast medium is clearly reflected. In a case of the tomosynthesis imaging, the generation unit 64 outputs image data representing the generated tomographic image 74 to the derivation unit 66 and the image processing unit 68.

The derivation unit 66 has a function of deriving contrast amount information about the contrast amount of the difference image generated by the generation unit 64. Examples of the contrast amount information include a numerical value indicating the contrast amount and a heat map of the contrast amount. In addition, the contrast amount information may be the difference image generated by the generation unit 64. The form of the contrast amount information may be determined in advance, or may be able to be selected or indicated by the user.

In a case in which the contrast amount information is a numerical value indicating the contrast amount of the region of interest, the derivation unit 66 first specifies the region of interest from the difference image. It should be noted that a method by which the derivation unit 66 specifies the region of interest from the difference image is not particularly limited. For example, the region of interest may be specified from the difference image by receiving information about the region of interest input by the user. Specifically, at least one image of the difference image, the low-energy image, or the high-energy image may be displayed on the display unit 58, and a region designated by the user operating the operation unit 56 on the display image may be received as the information about the region of interest. In addition, for example, the derivation unit 66 may specify the region of interest by applying computer aided diagnosis (CAD) to the difference image.

A pixel value of a pixel in the difference image corresponds to the contrast amount. Therefore, it is possible to derive the contrast amount from the pixel value of the difference image. The derivation unit 66 derives the contrast amount based on the pixel value of the pixel of the image corresponding to the specified region of interest. It should be noted that the derivation unit 66 may derive any of a total value, an average value, a median value, a maximum value, and the like of the contrast amount of the entire region of interest, and which value to derive may be determined in advance, or may be able to be designated by the user. In addition, the derivation unit 66 may derive the numerical value indicating the contrast amount regardless of the region of interest. For example, the derivation unit 66 may derive the numerical value indicating the contrast amount of the position or the region indicated by the user for the difference image or the like. In addition, for example, the derivation unit 66 may derive the numerical value indicating the contrast amount of the region outside the specified region of interest.

In addition, in a case in which the contrast amount information is the heat map of the contrast amount, the derivation unit 66 derives the contrast amount of the entire difference image and generates the heat map in which a value of the derived contrast amount is expressed as a color or a shade. It should be noted that a form may be adopted in which the contrast amount is represented in the heat map only in a case in which the contrast amount exceeds a threshold value. In addition, since the pixel value of the difference image corresponds to the contrast amount as described above, the derivation unit 66 may generate the heat map based on the pixel value of the difference image without deriving the contrast amount.

In addition, in a case in which the contrast amount information is the difference image, the derivation unit 66 uses the difference image generated by the generation unit 64 as the contrast amount information. It should be noted that the difference image used as the contrast amount information need only be a difference image that does not correspond to the difference image that has been subjected to image processing by the image processing unit 68, and may not be the difference image itself generated by the generation unit 64. In other words, the difference image used as the contrast amount information need only be an image in which the contrast amount in the difference image generated by the generation unit 64 appears. Therefore, for example, the derivation unit 66 may perform correction for removing artifacts, such as a scattered ray component and an oblique incidence component, on the difference image generated by the generation unit 64 to derive the corrected difference image as the contrast amount information. It should be noted that as a technology of removing the artifacts in this case, for example, a technology disclosed in WO2020/059306A can be applied.

The contrast amount information derived by the derivation unit 66 as described above is output to the display control unit 69.

The image processing unit 68 has a function of performing the image processing of enhancing the difference image. Examples of the image processing performed by the image processing unit 68 include gradation enhancement processing and frequency enhancement processing. The image processing unit 68 according to the present embodiment performs an analysis, such as a histogram analysis, on the difference image generated by the generation unit 64, specifies which image processing, the gradation enhancement processing or the frequency enhancement processing, to perform, and specifies a degree of enhancement. The image processing unit 68 performs the image processing on the difference image according to the specified image processing and degree of enhancement. It should be noted that it is preferable that the image processing unit 68 specifies the region of interest from the difference image and performs the image processing of enhancing the specified region of interest. A method by which the image processing unit 68 specifies the region of interest is not particularly limited, and may be the same as the method by which the derivation unit 66 specifies the region of interest. In this way, since the image processing unit 68 enhances the difference image, particularly, the region of interest in the difference image, the contrast amount represented by the difference image after the image processing may differ from the actual contrast amount.

The image data representing the difference image after the image processing generated by the image processing unit 68 as described above is output to the display control unit 69.

The display control unit 69 has a function of displaying, on the display unit 58, the contrast amount information derived by the derivation unit 66 and the difference image after the image processing generated by the image processing unit 68. In other words, the display control unit 69 has a function of displaying, on the display unit 58, the contrast amount information about the contrast amount of the difference image before the image processing by the image processing unit 68 and the difference image after the image processing.

Next, an action of the console 12 in the contrast imaging by the radiography system 1 according to the present embodiment will be described with reference to the drawings.

Figure 9:
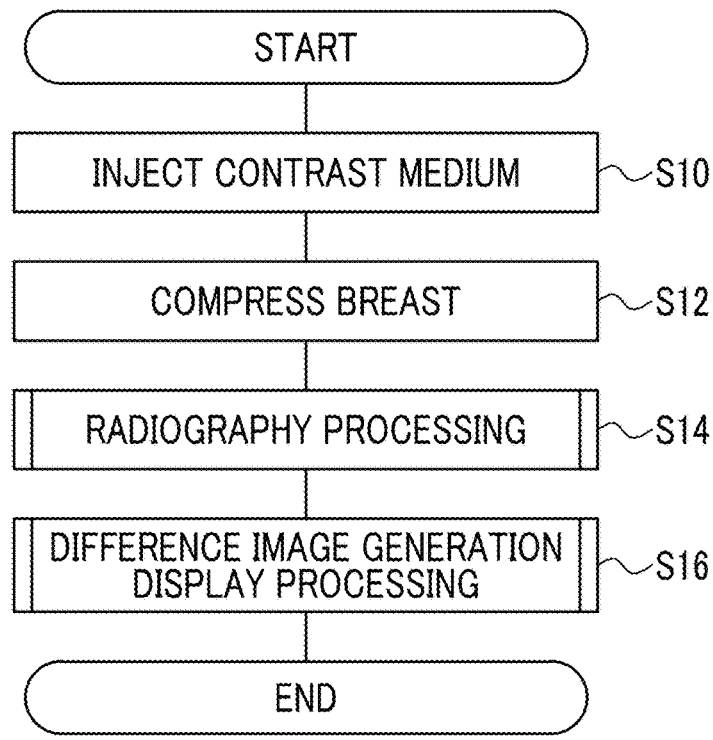
FIG. 9 is a flowchart showing an example of a flow of the contrast imaging by the radiography system according to the embodiment.

FIG. 9 shows a flowchart showing an example of a flow of the contrast imaging by the radiography system 1 according to the present embodiment. In a case in which the contrast imaging is performed, first, the user injects the contrast medium into the breast, which is the subject, as shown in step S10 of FIG. 9. Next, as shown in step S12, the user positions the breast of the examinee on the imaging table 30 of the mammography apparatus 10 and compresses the breast with the compression plate 40.

Figure 10:
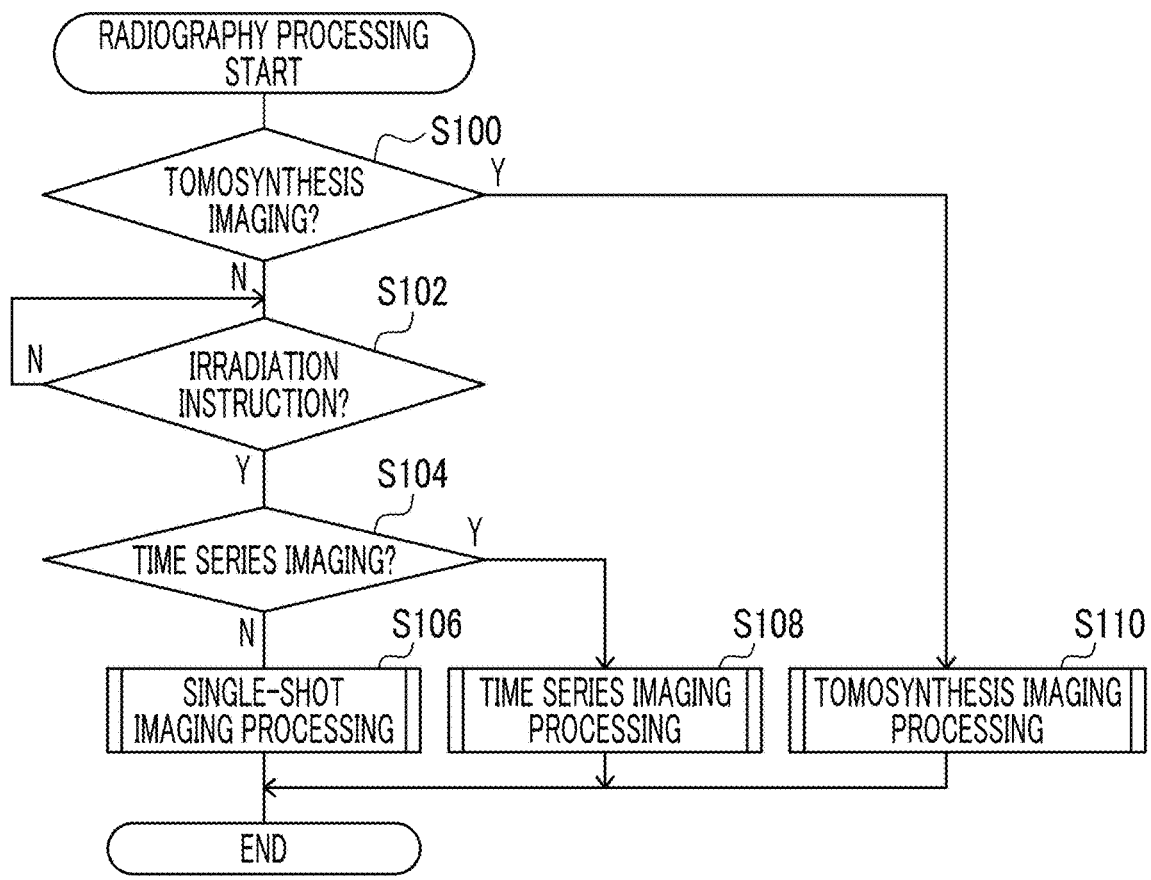
FIG. 10 is a flowchart showing an example of a flow of radiography processing executed in the contrast imaging.

Next, in step S14, radiography processing shown in FIG. 10 of capturing the low-energy image and the high-energy image by the mammography apparatus 10 is performed by the console 12. In the console 12 according to the present embodiment, as an example, the CPU 50A of the control unit 50 executes the imaging control processing program 51A stored in the ROM 50B, thereby executing the radiography processing shown in FIG. 10 as an example. FIG. 10 shows a flowchart showing an example of a flow of the radiography processing executed in the console 12 according to the present embodiment.

In step S100 of FIG. 10, the control unit 60 determines whether or not the type of imaging to be performed is the tomosynthesis imaging. In a case in which the type of imaging set in an imaging menu is not the tomosynthesis imaging, in other words, in a case in which the type of imaging set in the imaging menu is the single-shot imaging or the time series imaging, the control unit 60 makes a negative determination in the determination in step S100, and proceeds to step S102.

In step S102, the control unit 60 determines whether or not the irradiation instruction of the radiation R is received. A negative determination is made in the determination in step S102 until the irradiation instruction is received. On the other hand, in a case in which the irradiation instruction is received, a positive determination is made in the determination in step S102, and the processing proceeds to step S104.

In step S104, the control unit 60 determines whether or not the type of imaging to be performed is the time series imaging. In a case in which the type of imaging set in an imaging menu is not the time series imaging, in other words, in a case in which the type of imaging set in the imaging menu is the single-shot imaging, the control unit 60 makes a negative determination in the determination in step S104, and proceeds to step S106.

Figure 11A:
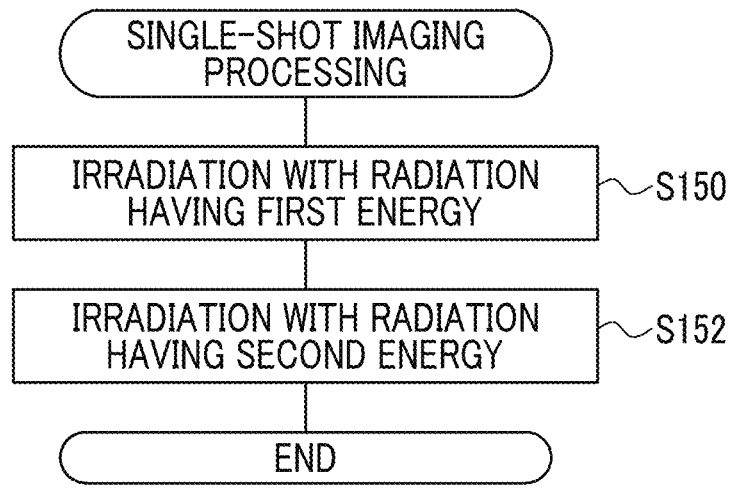
FIG. 11A is a flowchart showing an example of a flow of single-shot imaging processing executed in the radiography processing.

In step S106, the control unit 60 executes single-shot imaging processing shown in FIG. 11A. In step S150 of the single-shot imaging processing shown in FIG. 11A, the control unit 60 outputs an instruction to perform the irradiation with the radiation R having the first energy to the mammography apparatus 10. In the mammography apparatus 10, the control unit 20 emits the radiation R having the first energy from the radiation source 37R toward the breast based on the instruction input from the console 12, and the low-energy image is captured by the radiation detector 28.

In next step S152, the control unit 60 outputs the instruction to perform the irradiation with the radiation R having the second energy to the mammography apparatus 10. In the mammography apparatus 10, the control unit 20 emits the radiation R having the second energy from the radiation source 37R toward the breast based on the instruction input from the console 12, and the high-energy image is captured by the radiation detector 28. In a case in which the processing of step S152 ends, the single-shot imaging processing ends. In a case in which the single-shot imaging processing ends, step S106 of the radiography processing shown in FIG. 10 ends, and the radiography processing ends. It should be noted that, in the present embodiment, the form has been described in which the high-energy image is captured after the low-energy image is captured, but an order for capturing the low-energy image and the high-energy image may be reversed. That is, the order of the processing of step S150 and the processing of step S152 in the single-shot imaging processing may be switched.

On the other hand, in a case in which the type of imaging to be performed is the time series imaging, a positive determination is made in the determination in step S104 of the radiography processing, and the processing proceeds to step S108.

Figure 11B:
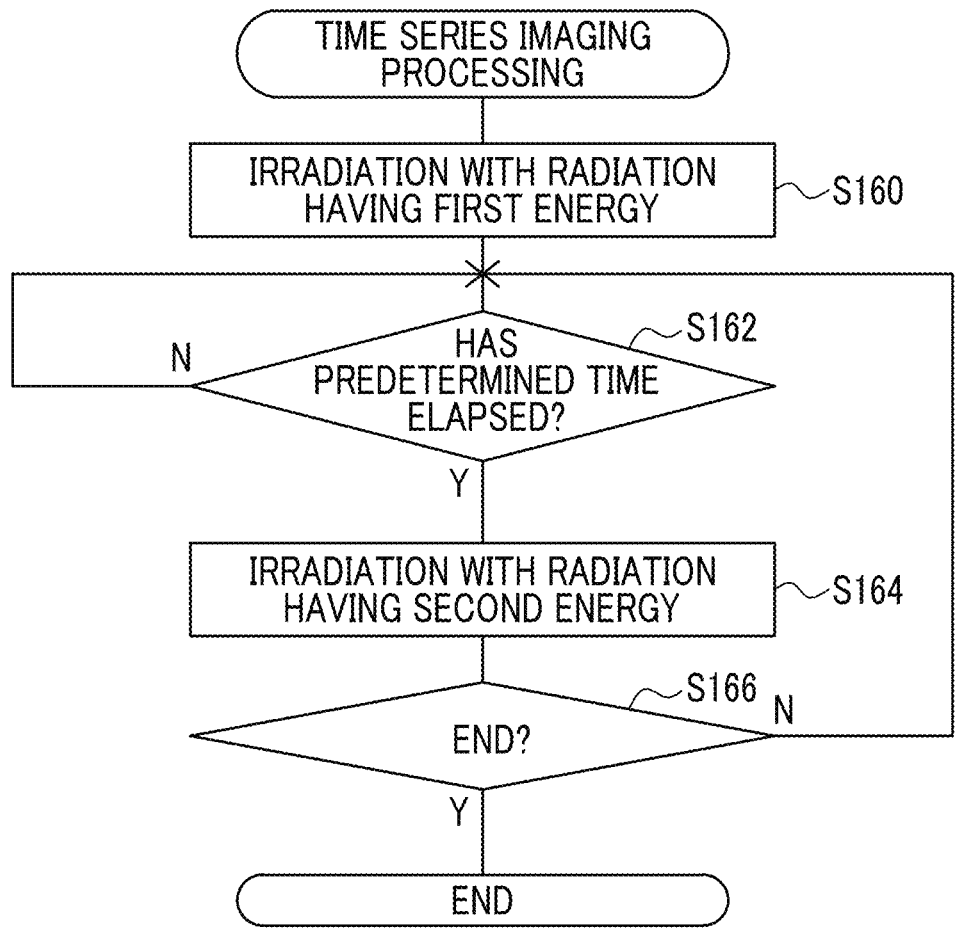
FIG. 11B is a flowchart showing an example of a flow of time series imaging processing executed in the radiography processing.

In step S108, the control unit 60 executes time series imaging processing shown in FIG. 11B. In step S160 of the time series imaging processing shown in FIG. 11B, the control unit 60 outputs an instruction to perform the irradiation with the radiation R having the first energy to the mammography apparatus 10. In the mammography apparatus 10, the control unit 20 emits the radiation R having the first energy from the radiation source 37R toward the breast based on the instruction input from the console 12, and the low-energy image is captured by the radiation detector 28.

In next step S162, the control unit 60 determines whether or not a predetermined time has elapsed. A negative determination is made in the determination in step S162 until the predetermined time elapses. On the other hand, in a case in which the predetermined time has elapsed, a positive determination is made in the determination in step S162, and the processing proceeds to step S164.

In step S164, the control unit 60 outputs the instruction to perform the irradiation with the radiation R having the second energy to the mammography apparatus 10. In the mammography apparatus 10, the control unit 20 emits the radiation R having the second energy from the radiation source 37R toward the breast based on the instruction input from the console 12, and the high-energy image is captured by the radiation detector 28.

In next step S166, the control unit 60 determines whether or not to end the time series imaging. Until a predetermined end condition is satisfied, a negative determination is made in the determination in step S166, the processing returns to step S162, and the processing of steps S162 and S164 is repeated. On the other hand, in a case in which the end condition is satisfied, a positive determination is made in the determination in step S166, and the time series imaging processing ends. It should be noted that the end condition is not limited. The end condition may be, for example, a condition in which the processing ends in a case in which an elapsed time from the injection of the contrast medium into the breast has passed a time that is determined as the imaging time, in a case in which an elapsed time from the start of the irradiation with the radiation R has passed a time that is determined as a cumulative time of the irradiation time in the contrast imaging, in a case in which the number of times of capturing of the radiation image reaches a predetermined number of times, and in a case in which an instruction to end the imaging is received from the user. In addition, examples of the end condition include a condition in which the processing ends in a case in which the contrast amount is not changed as an analysis result of the radiation image captured by the control unit 60. Specifically, the end condition may be a condition in which the processing ends in a case in which the difference between the high-energy images is equal to or smaller than the threshold value, particularly, in a case in which the difference between pixel values of the region of interest in the high-energy images is equal to or smaller than the threshold value. In a case in which the time series imaging processing ends, step S108 of the radiography processing shown in FIG. 10 ends, and the radiography processing ends.

On the other hand, in a case in which the type of imaging to be performed is the tomosynthesis imaging, a positive determination is made in the determination in step S100 of the radiography processing, and the processing proceeds to step S110.

Figure 11C:
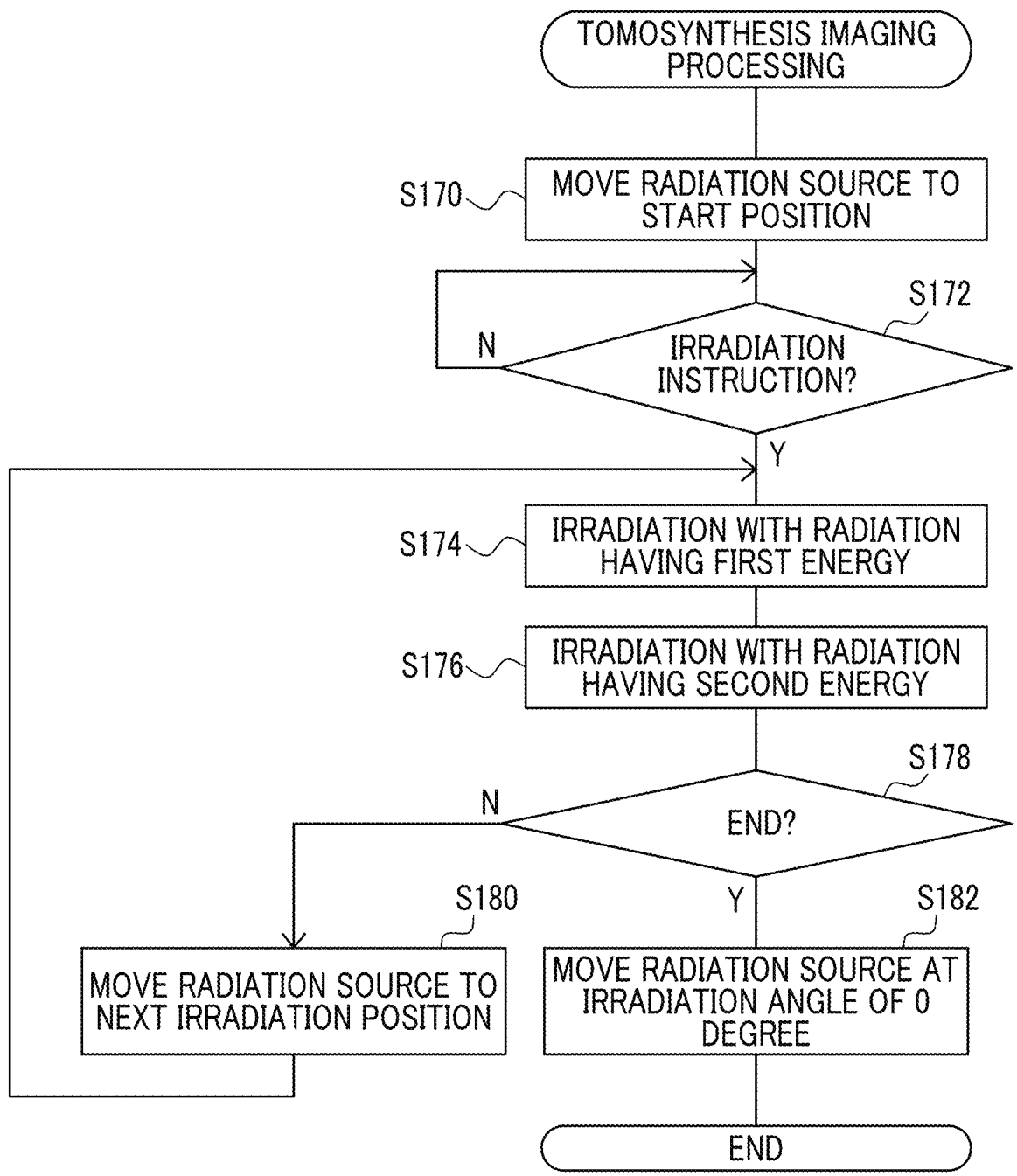
FIG. 11C is a flowchart showing an example of a flow of tomosynthesis imaging processing executed in the radiography processing.

In step S110, the control unit 60 executes tomosynthesis imaging processing shown in FIG. 11C.

In step S170 of the tomosynthesis imaging processing shown in FIG. 11C, the control unit 60 moves the radiation source 37R to the irradiation position $39_k$, which is a start position at which the irradiation with the radiation is started.

In next step S172, the control unit 60 determines whether or not the irradiation instruction of the radiation R is received, as in step S102 of the radiography processing. A negative determination is made in the determination in step S172 until the irradiation instruction is received. On the other hand, in a case in which the irradiation instruction is received, a positive determination is made in the determination in step S172, and the processing proceeds to step S174.

In step S174, the control unit 60 outputs the instruction to perform the irradiation with the radiation R having the first energy to the mammography apparatus 10. In the mammography apparatus 10, the control unit 20 emits the radiation R having the first energy from the radiation source 37R toward the breast based on the instruction input from the console 12, and the low-energy image is captured by the radiation detector 28.

In next step S176, the control unit 60 outputs the instruction to perform the irradiation with the radiation R having the second energy to the mammography apparatus 10. In the mammography apparatus 10, the control unit 20 emits the radiation R having the second energy from the radiation source 37R toward the breast based on the instruction input from the console 12, and the high-energy image is captured by the radiation detector 28.

In next step S178, the control unit 60 determines whether or not to end the tomosynthesi s imaging. In a case in which the position of the radiation source 37R is not yet at the position corresponding to the last irradiation position $39_k$, a negative determination is made in the determination in step S178, and the processing proceeds to step S180.

In step S180, the control unit 60 moves the radiation source 37R to the next irradiation position $39_k$, then returns to step S174, and repeats the processing of steps S174 to S178. On the other hand, in a case in which the position of the radiation source 37R is the position corresponding to the final irradiation position $39_k$, a positive determination is made in the determination in step S178, and the processing proceeds to step S182. In step S182, the control unit 60 moves the radiation source 37R to a position of the irradiation position $39_k$ at which the irradiation angle α is 0 degrees (irradiation position $39_k$ along the normal direction, the irradiation position $39_3$ in FIG. 2B). In a case in which the processing of step S182 ends, the tomosynthesis imaging ends. In a case in which the tomosynthesis imaging ends, step S110 of the radiography processing shown in FIG. 10 ends, and the radiography processing ends. It should be noted that, in the present embodiment, as in the single-shot imaging described above, the form has been described in which the high-energy image is captured after the low-energy image is captured, but an order for capturing the low-energy image and the high-energy image may be reversed. That is, the order of the processing of step S174 and the processing of step S176 in the tomosynthesis imaging processing may be switched.

In this way, in a case in which the radiography processing shown in FIG. 10 ends, the contrast imaging ends, and the processing of step S14 shown in FIG. 9 ends.

Figure 12:
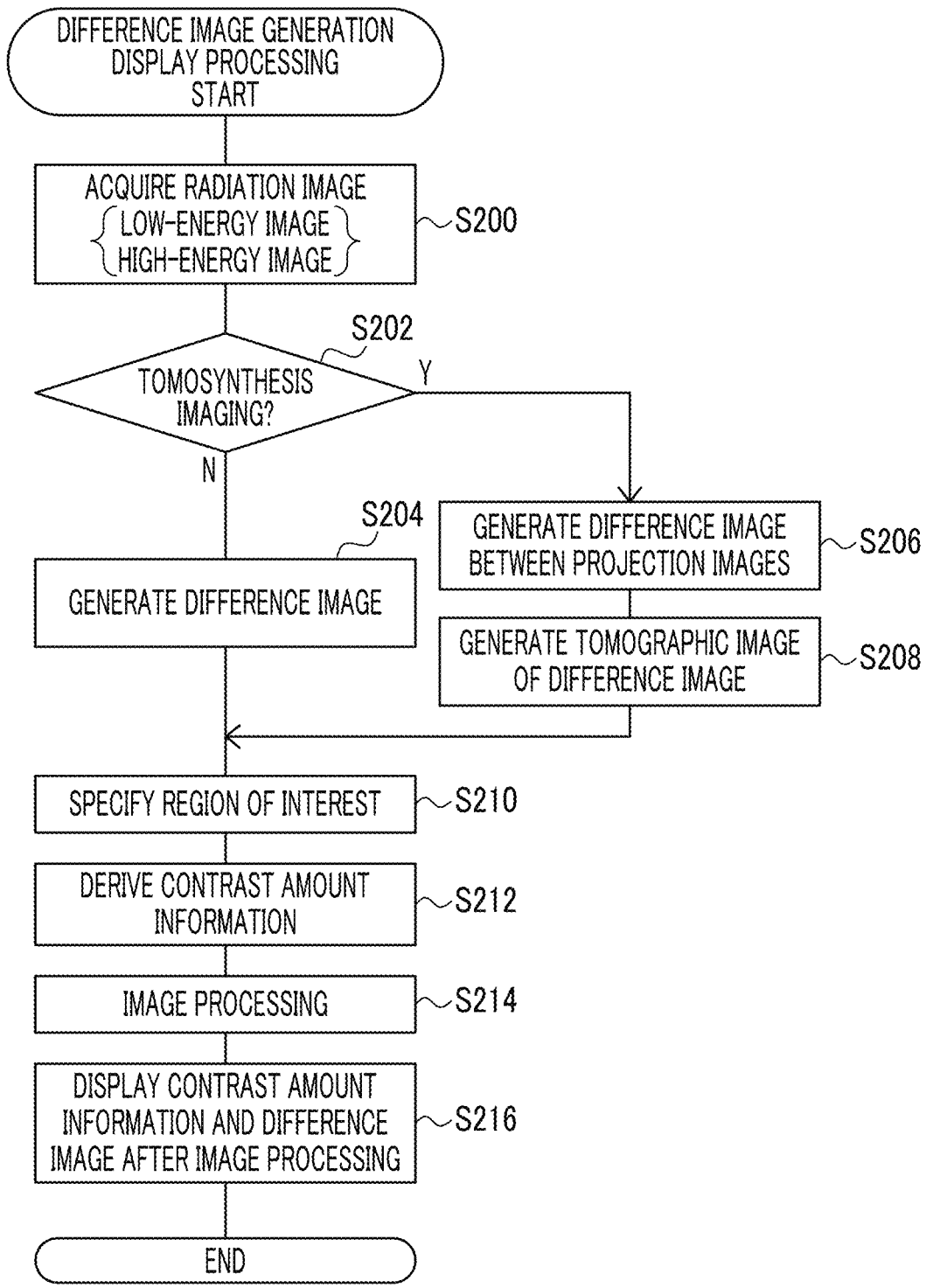
FIG. 12 is a flowchart showing an example of a flow of difference image generation display processing executed in the contrast imaging.

In next step S16, the console 12 performs difference image generation display processing shown in FIG. 12. In the console 12 according to the present embodiment, as an example, the CPU 50A of the control unit 50 executes the image processing program 51B stored in the ROM 50B, thereby executing the difference image generation display processing shown in FIG. 12 as an example. FIG. 12 shows a flowchart showing an example of a flow of the difference image generation display processing executed in the console 12 according to the present embodiment.

In step S200, as described above, the acquisition unit 62 acquires the low-energy image and the high-energy image captured by the contrast imaging from the mammography apparatus 10. Specifically, in a case in which the type of performed imaging is the tomosynthesis imaging, the low-energy projection image and the high-energy projection image are acquired as described above. It should be noted that a timing at which the acquisition unit 62 acquires the low-energy image and the high-energy image is not limited. For example, the low-energy image and the high-energy image may be acquired from the mammography apparatus 10 each time each of the low-energy image and the high-energy image is captured. In addition, for example, the low-energy image and the high-energy image stored in the storage unit 22 of the mammography apparatus 10 may be acquired after capturing all the low-energy images and the high-energy images ends. In addition, an order of acquiring the low-energy image and the high-energy image is not limited.

In next step S202, the generation unit 64 determines whether or not the type of performed imaging is the tomosynthesis imaging. In a case in which the type of performed imaging is not the tomosynthesis imaging, in other words, in a case in which the type of performed imaging is the single-shot imaging or the time series imaging, a negative determination is made in the determination in step S202, and the processing proceeds to step S204.

In step S204, as described above, the generation unit 64 generates the difference image from the low-energy image and the high-energy image acquired in step S200, and then proceeds to step S210. As described above, in a case in which the type of performed imaging is the single-shot imaging, the generation unit 64 generates one difference image. In addition, in a case in which the type of performed imaging is the time series imaging, the generation unit 64 generates the plurality of difference images of the same number as the high-energy images acquired in step S200.

On the other hand, in a case in which the type of performed imaging is the tomosynthesis imaging, a positive determination is made in the determination in step S202, and the processing proceeds to step S206. In step S206, as described above, the generation unit 64 generates the difference image between the projection images for each irradiation position $39_k$. Specifically, the generation unit 64 generates the difference image from the low-energy projection image and the high-energy projection image for each irradiation position $39_k$.

In next step S208, the generation unit 64 reconstructs the plurality of difference images generated in step S206 as described above to generate the tomographic image, and then proceeds to step S210.

In step S210, the derivation unit 66 specifies the region of interest from the difference image, as described above. In a case in which the type of performed imaging is the single-shot imaging or the time series imaging, the derivation unit 66 specifies the region of interest from the difference image generated in step S204. On the other hand, in a case in which the type of performed imaging is the tomosynthesis imaging, the derivation unit 66 specifies the region of interest from the tomographic image generated in step S208.

In next step S212, the derivation unit 66 derives the contrast amount information, as described above. In a case in which the type of performed imaging is the single-shot imaging or the time series imaging, the derivation unit 66 derives the contrast amount information from the difference image generated in step S204.

Figure 13A:
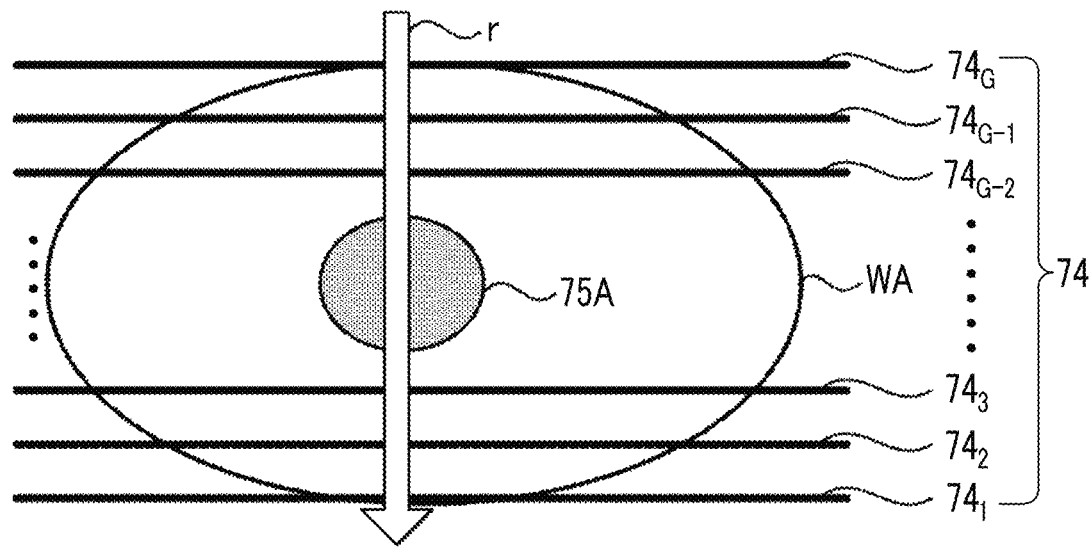
FIG. 13A is a diagram showing a form in which a numerical value indicating a contrast amount is derived as contrast amount information from the tomographic image.

On the other hand, in a case in which the type of performed imaging is the tomosynthesis imaging, the derivation unit 66 derives the contrast amount information from the tomographic image generated in step S208. With reference to FIG. 13A, a form will be described in which the numerical value indicating the contrast amount is derived as the contrast amount information from the tomographic image 74. In a case in which the numerical value indicating the contrast amount is derived as the contrast amount information from the tomographic image 74, the derivation unit 66 may derive the numerical value indicating the contrast amount from each tomographic image 74 for each of the series of tomographic images 74. In the example shown in FIG. 13A, the derivation unit 66 may derive the numerical value indicating the contrast amount for each of G tomographic images 74 ($74_1$ to $74_G$). In addition, the derivation unit 66 may derive the total value of the contrast amounts in a transmission path in a transmission direction r in which the radiation R represented by an arrow in FIG. 13A is transmitted.

Figure 13B:
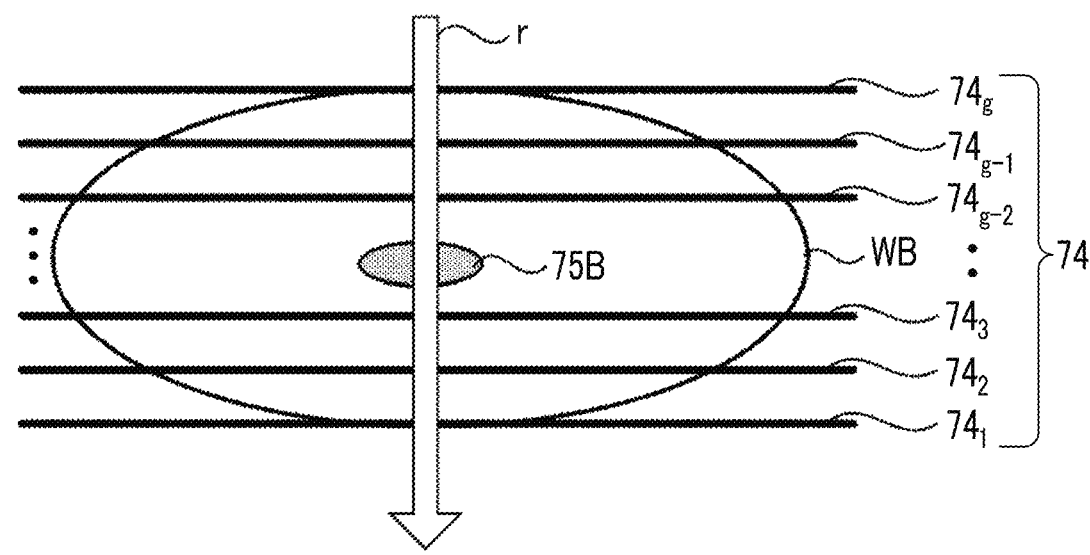
FIG. 13B is a diagram showing a form in which the numerical value indicating the contrast amount is derived as the contrast amount information from the tomographic image.

In addition, the derivation unit 66 may derive a density of the contrast medium in the region of interest as the numerical value indicating the contrast amount. FIG. 13B shows an example in a case in which the generation unit 64 generates g (G>g) tomographic images 74 ($74_1$ to $74_g$). In the example shown in FIG. 13A and the example shown in FIG. 13B, a thickness of a breast WB in FIG. 13B is smaller than a thickness of a breast WA in FIG. 13A. Since the slice thicknesses are the same in the example shown in FIG. 13A and the example shown in FIG. 13B, the number g of the tomographic images 74 for the breast WB is smaller than the number G of the tomographic images 74 for the breast WA. In addition, a region of interest 75B has a shorter length in the transmission direction r than a region of interest 75A. Therefore, even in a case in which the densities of the region of interest 75A and the region of interest 75B are the same, the total value of the contrast amounts in the transmission path is different between the region of interest 75A and the region of interest 75B. As described above, the density of the region of interest cannot be known from the total value of the contrast amounts in the transmission path. Therefore, it is difficult to know the degree of permeation of the contrast amount of the region of interest, such as the lesion, from the total value of the contrast amounts in the transmission path. Therefore, the derivation unit 66 may derive the density of the contrast amount of the region of interest as the contrast amount information. For example, the derivation unit 66 may derive the density of the contrast amount by specifying the position of the tomographic image 74 in which the image of the specified region of interest is reflected, deriving a length of the region of interest in the transmission direction r from the specified position of the tomographic image 74, and dividing the total value of the contrast amounts in the transmission path by the length of the region of interest.

In next step S214, the image processing unit 68 performs the image processing, as described above. In a case in which the type of performed imaging is the single-shot imaging or the time series imaging, the image processing unit 68 performs the image processing of enhancing the difference image generated in step S204. On the other hand, in a case in which the type of performed imaging is the tomosynthesis imaging, the image processing unit 68 performs the image processing of enhancing the tomographic image generated in step S208.

In next step S216, as described above, the display control unit 69 performs control of displaying, on the display unit 58, the contrast amount information derived in step S212 and the difference image after the image processing in step S214, and then the present difference image generation display processing ends.

Figure 14A:
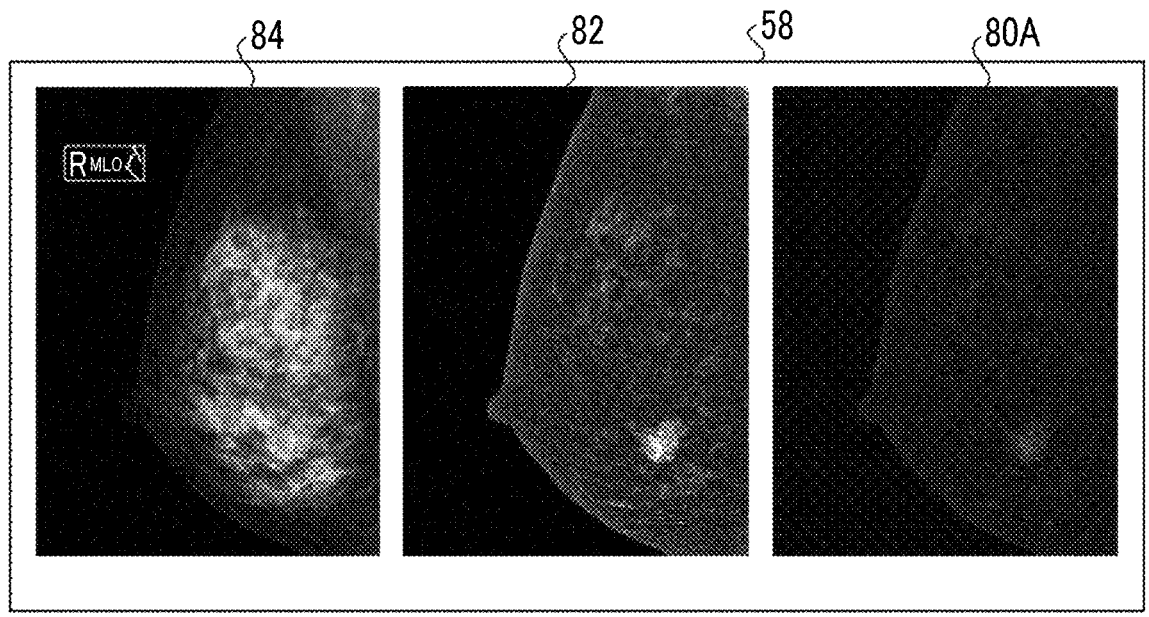
FIG. 14A is a diagram showing an example of a state in which a difference image before image processing and a difference image after image processing are displayed on a display unit as the contrast amount information.

FIG. 14A shows an example of a state in which the contrast amount information and the difference image after the image processing are displayed on the display unit 58. FIG. 14A shows an example of a case in which a difference image 80A before the image processing is displayed as the contrast amount information. As shown in FIG. 14A, the display control unit 69 according to the present embodiment displays, on the display unit 58, a difference image 82 after the image processing and the difference image 80A before the image processing. In addition, as shown in FIG. 14A, the display control unit 69 also displays a radiation image 84 on the display unit 58 as a comparative example in a case in which there is the radiation image 84 captured by the general imaging for the breast which is the subject, in other words, the radiation image 84 captured in a state in which the contrast medium has not been injected. It should be noted that, in the example shown in FIG. 14A, the form has been described in which the difference image 80A before the image processing and the difference image 82 after the image processing are displayed side by side, but a form may be adopted in which any one of the difference image 80A before the image processing or the difference image 82 after the image processing is displayed and the image to be displayed is switched according to the instruction of the user. It should be noted that, in a case in which the type of performed imaging is the time series imaging, the plurality of difference images generated by the generation unit 64 may be continuously displayed as the moving image in a time series order as the difference images 80A before the image processing. It should be noted that, in the present embodiment, the "moving image" means that still images are displayed one after another at high speed and recognized as the moving image. Therefore, the so-called "frame advance" is also included in the moving image depending on a degree of "high speed" in the display. In addition, in a case in which the type of performed imaging is the tomosynthesis imaging, a form may be adopted in which, in a case in which the tomographic position designated by the user is switched, the display is switched between the difference image 80A (tomographic image) before the image processing according to the tomographic position displayed on the display unit 58 and the difference image 82 (tomographic image) after the image processing.

Figure 14B:
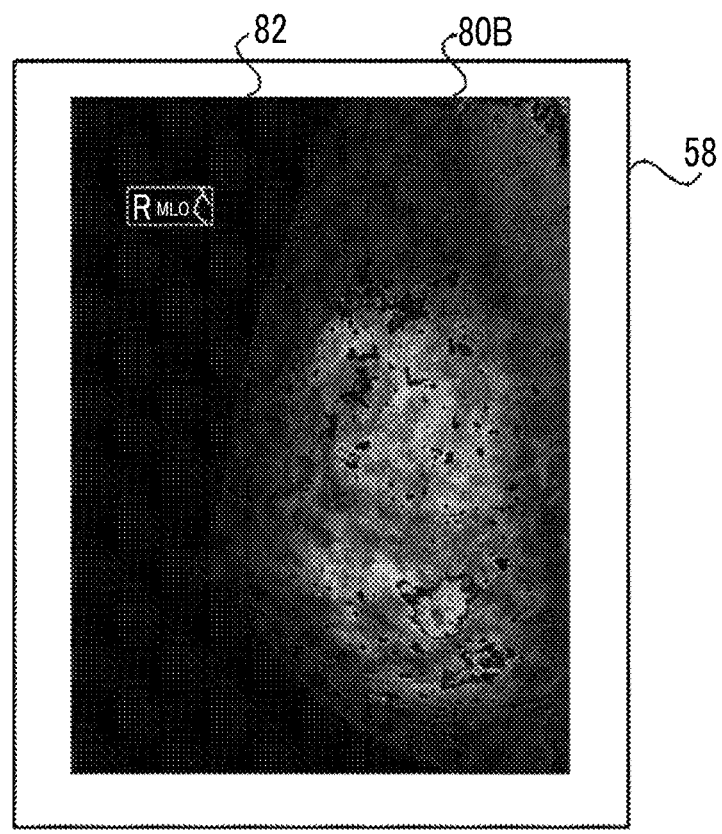
FIG. 14B is a diagram showing an example of a state in which a heat map and the difference image after the image processing are displayed on the display unit as the contrast amount information.
Figure 14C:
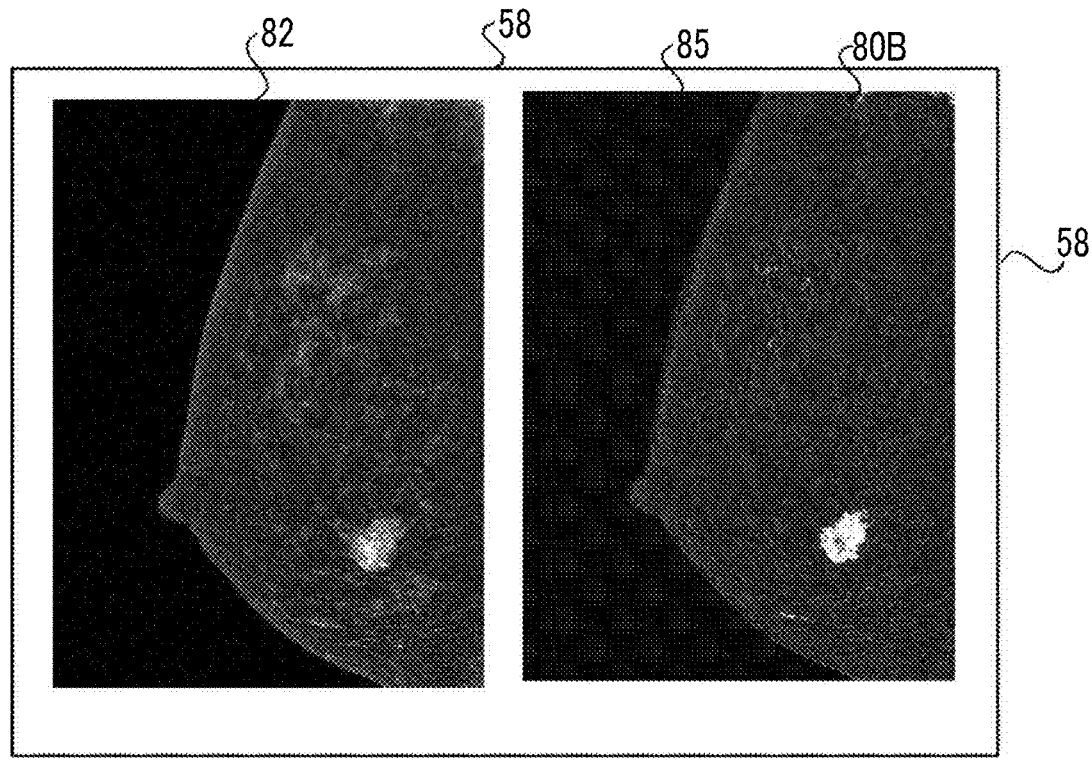
FIG. 14C is a diagram showing another example of the state in which the heat map and the difference image after the image processing are displayed on the display unit as the contrast amount information.

In addition, FIG. 14B shows an example of a case in which a heat map 80B is displayed as the contrast amount information. The example shown in FIG. 14B shows an example of a form in which the heat map 80B is displayed in a manner being superimposed on the difference image 82 after the image processing. In addition, FIG. 14C shows another example of the case in which the heat map 80B is displayed as the contrast amount information. The example shown in FIG. 14C shows an example of a form in which the heat map 80B is displayed in a manner being superimposed on the low-energy image 85. By displaying the heat map 80B in a manner being superimposed on the low-energy image 85, a relationship between the mammary gland structure and the contrast amount can be displayed in an easy-to-understand manner.

Figure 14D:
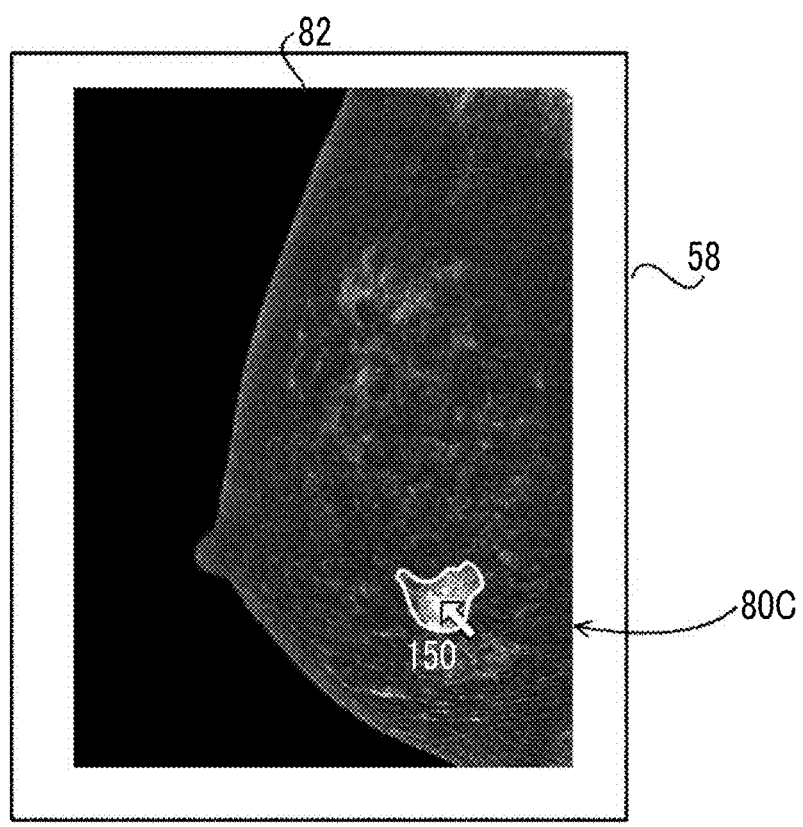
FIG. 14D is a diagram showing an example of a state in which the numerical value indicating the contrast amount is displayed as the contrast amount information.

Further, FIG. 14D shows an example of a case in which a numerical value 80C representing the contrast amount is displayed as the contrast amount information. The example shown in FIG. 14C shows an example of a form in which a numerical value (see FIG. 14, "150") representing the contrast amount of the region of interest indicated by the user (see FIG. 14, white arrow) in the difference image 82 after the image processing is displayed.

In this way, in a case in which the difference image generation display processing shown in FIG. 12 ends, the difference image generation display processing in step S16 shown in FIG. 9 ends. As a result, the series of processing related to the contrast imaging in the radiography system 1 according to the present embodiment ends. It should be noted that a form may be adopted in which the low-energy image and the plurality of high-energy images, which are captured by the mammography apparatus 10 according to the present embodiment, the plurality of difference images, the tomographic image, and the contrast amount information, which are generated by the console 12, and the like are stored in the storage unit 52 of the console 12, picture archiving and communication systems (PACS), or the like.

In addition, in each form described above, the form has been described in which the difference image generation display processing is continuously performed after the radiography processing which is the processing of S14 in FIG. 9 ends, in other words, after the contrast imaging ends, but the timing for performing the difference image generation display processing, that is, the timing for generating the difference image or displaying the difference image is not limited to the present form. For example, a form may be adopted in which the timing of each of the generation of the difference image and the display of the difference image is a timing according to the user's desire after the contrast imaging.

As described above, the console 12 of each form described above comprises the CPU 50A as at least one processor. The CPU 50A acquires the low-energy image captured by the mammography apparatus 10 by emitting the radiation R having the first energy to the breast into which the contrast medium has been injected, and the high-energy image captured by the mammography apparatus 10 by emitting the radiation R having the second energy higher than the first energy to the breast into which the contrast medium has been injected. In addition, the CPU 50A generates the difference image showing the difference between the low-energy image and the high-energy image. In addition, the CPU 50A performs the image processing of enhancing the difference image. In addition, the CPU 50A displays the difference image after the image processing and the contrast amount information about the contrast amount of the difference image before the image processing.

As described above, with the console 12 according to the present embodiment, the difference image after the image processing of enhancing the difference image and the contrast amount information about the contrast amount of the difference image before the image processing are displayed. The difference image after the image processing is the image in which the mammary gland structure is removed and the contrast medium is enhanced and made to be easily seen. On the other hand, since the contrast amount information about the contrast amount of the difference image before the image processing is the information indicating the contrast amount that is not influenced by the image processing or that excludes the influence of the image processing, an accurate contrast amount is provided. Therefore, with the console 12 according to the present embodiment, the contrast medium can be easily observed and the contrast amount can be easily evaluated.

It should be noted that, in the form described above, the form has been described in which the image processing unit 68 performs the image processing on the difference image generated by the generation unit 64 as the image processing of enhancing the difference image, but a target on which the image processing unit 68 performs the image processing is not limited to the difference image. For example, the image processing unit 68 may perform the image processing on each of the low-energy image and the high-energy image. In this case, the generation unit 64 generates the difference image showing the difference between the low-energy image after the image processing and the high-energy image after the image processing, so that the generated difference image can be enhanced as in the form described above.

In addition, in the form described above, the form has been described in which the derivation unit 66 generates the contrast amount information from the difference image before the image processing, but the generation method of the contrast amount information is not limited to the present form. For example, a form may be adopted in which the derivation unit 66 derives the contrast amount information about the contrast amount of the difference image before the image processing by removing the influence of the image processing from the contrast amount derived from the difference image after the image processing by the image processing unit 68.

Figure 15:
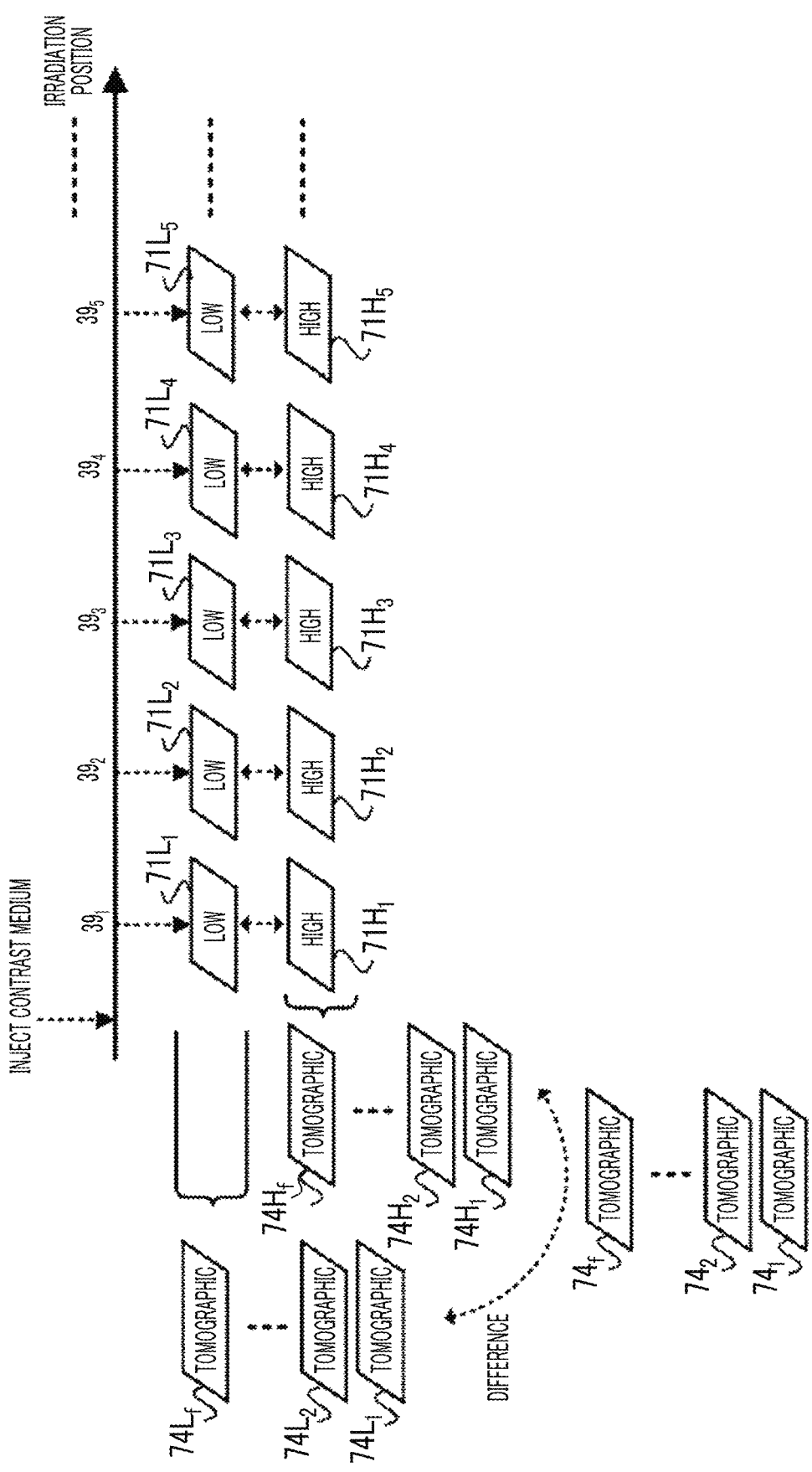
FIG. 15 is a diagram showing another example of the generation method of the difference image and the tomographic image in the tomosynthesis imaging.

In addition, in the form described above, the form has been described in which, in a case in which the type of imaging is the tomosynthesis imaging, as described with reference to FIG. 8, the generation unit 64 generates the difference image 73 between each low-energy projection image 71L and each high-energy projection image 71H, and generates the tomographic image 74 by reconstructing the plurality of generated difference images 73, but the generation method of the tomographic image is not limited to the present form. For example, a form may be adopted in which the difference image between the tomographic image generated by reconstructing the low-energy image and the tomographic image generated by reconstructing the high-energy image is generated. An example of this case will be described in detail with reference to FIG. 15. In the example shown in FIG. 15, the generation unit 64 reconstructs the low-energy projection image 71L (see FIG. 15, $71L_1$ to $71L_5$) to generate the tomographic image 74L (see FIG. 15, $74L_1$ to $74L_f$). In addition, the generation unit 64 reconstructs the high-energy projection image 71H (see FIG. 15, $71H_1$ to $71_5$) to generate the tomographic image 74H (FIG. 15, $74H_1$ to $74H_f$). Then, the generation unit 64 generates the tomographic image 74 (see FIGS. 15, $74_1$ to $74_f$) which is the difference image showing the difference between the tomographic image 74L and the tomographic image 74H at the corresponding slice positions. By this processing, the tomographic image 74 is generated as in the form described above. The tomographic image 74L according to the present form is an example of a low-energy tomographic image according to the present disclosure, and the tomographic image 74H of the present form is an example of a high-energy tomographic image according to the present disclosure.

In addition, in the form described above, the form has been described in which, in a case in which the type of imaging is the tomosynthesis imaging, the operation of moving the radiation R to the next irradiation position $39_k$ after capturing the low-energy image by emitting the radiation R having the first energy at the irradiation position $39_k$ and capturing the high-energy image by emitting the radiation R having the second energy is repeated, but the method of the tomosynthesis imaging is not limited to the present form. For example, a form may be adopted in which the low-energy image is captured by emitting the radiation R having the first energy at each irradiation position $39_k$, and then the high-energy image is captured by emitting the radiation R having the second energy at each irradiation position $39_k$.

In addition, in the form described above, the form has been described in which the breast is applied as an example of the subject according to the present disclosure, and the mammography apparatus 10 is applied as an example of the radiography apparatus according to the present disclosure, but the subject is not limited to the breast, and the radiography apparatus is not limited to the mammography apparatus. For example, the subject may be a chest, an abdomen, or the like, and a form may be adopted in which a radiography apparatus other than the mammography apparatus is applied as the radiography apparatus.

In addition, in the form described above, the form has been described in which the console 12 is an example of the image processing apparatus according to the present disclosure, but an apparatus other than the console 12 may have the function of the image processing apparatus according to the present disclosure. In other words, some or all of the functions of the control unit 60, the acquisition unit 62, the generation unit 64, the derivation unit 66, the image processing unit 68, and the display control unit 69 may be provided in an apparatus other than the console 12, for example, the mammography apparatus 10 or an external apparatus.

In addition, in the form described above, various processors shown below can be used as the hardware structure of processing units that execute various pieces of processing, such as the control unit 60, the acquisition unit 62, the generation unit 64, the derivation unit 66, the image processing unit 68, and the display control unit 69. As described above, the various processors include, in addition to the CPU which is a general-purpose processor which executes software (program) and functions as various processing units, a programmable logic device (PLD) which is a processor of which a circuit configuration can be changed after manufacture, such as a field programmable gate array (FPGA), and a dedicated electric circuit which is a processor having a circuit configuration which is designed for exclusive use in order to execute specific processing, such as an application specific integrated circuit (ASIC).

One processing unit may be composed of one of the various processors or may be composed of a combination of two or more processors of the same type or different types (for example, a combination of a plurality of FPGAs or a combination of a CPU and an FPGA). In addition, a plurality of processing units may be composed of one processor.

A first example of the configuration in which the plurality of processing units are composed of one processor is a form in which one processor is composed of a combination of one or more CPUs and software and the processor functions as the plurality of processing units, as represented by the computer, such as a client and a server. Second, as represented by a system on chip (SoC) or the like, there is a form of using a processor that realizes the function of the entire system including the plurality of processing units by one integrated circuit (IC) chip. As described above, various processing units are composed of one or more of the various processors as the hardware structure.

Further, more specifically, an electric circuit (circuitry) obtained by combining circuit elements, such as semiconductor elements, can be used as the hardware structure of the various processors.

In addition, in each embodiment described above, the aspect has been described in which the imaging control processing program 51A and the image processing program 51B are stored (installed) in advance in the ROM 50B, but the present disclosure is not limited to this. Each of the imaging control processing program 51A and the image processing program 51B may be provided in a form being recorded in the recording medium, such as a compact disc read only memory (CD-ROM), a digital versatile disc read only memory (DVD-ROM), and a universal serial bus (USB) memory. In addition, a form may be adopted in which each of the imaging control processing program 51A and the image processing program 51B is downloaded from an external apparatus via a network.

The disclosure of JP2020-162696 filed on Sep. 28, 2020 is incorporated in the present specification by reference in its entirety.

All documents, patent applications, and technical standards described in the present specification are incorporated in the present specification by reference to the same extent as a case in which each document, patent application, and technical standard are specifically and individually noted to be incorporated by reference.

What is claimed is:

1. An image processing apparatus comprising:
at least one processor that is configured to:
acquire a low-energy image captured by a radiography apparatus by emitting radiation having first energy to a subject into which a contrast medium has been injected, and a high-energy image captured by the radiography apparatus by emitting radiation having second energy higher than the first energy to the subject into which the contrast medium has been injected,
generate a difference image showing a difference between the low-energy image and the high-energy image,
perform image processing of enhancing the contrast medium shown in the difference image, and
display the difference image after the image processing and contrast amount information about a contrast amount of a difference image before the image processing,
wherein the contrast amount information is a heat map of the contrast amount, and
the at least one processor is configured to display the heat map in a manner being superimposed on the difference image after the image processing.

2. The image processing apparatus according to claim 1, wherein the at least one processor is configured to:
cause the radiography apparatus to capture a plurality of the high-energy images to acquire the plurality of captured high-energy images, and
generate the difference image for each of the plurality of high-energy images.

3. The image processing apparatus according to claim 1, wherein the radiography apparatus is able to perform tomosynthesis imaging of emitting radiation from each of a plurality of different irradiation angles to the subject to capture the low-energy image and the high-energy image for each of the plurality of irradiation angles, and
the at least one processor is configured to generate, as the difference image, a difference image showing a difference between a low-energy tomographic image generated by reconstructing a plurality of the low-energy images and a high-energy tomographic image generated by reconstructing a plurality of the high-energy images.

4. The image processing apparatus according to claim 1, wherein the radiography apparatus is able to perform tomosynthesis imaging of emitting radiation from each of a plurality of different irradiation angles to the subject to capture, as a pair of projection images, the low-energy image and the high-energy image for each of the plurality of irradiation angles, and
the at least one processor is configured to:
generate a projection difference image showing a difference between the pair of projection images for each irradiation angle, and generate, as the difference image, a tomographic image generated by reconstructing a plurality of the generated projection difference images.

5. The image processing apparatus according to claim 3, wherein the at least one processor is configured to:

derive, from the tomographic image, a length of a region of interest in a transmission direction in which the radiation is transmitted, and derive, as the contrast amount information, a density of a contrast medium in the region of interest based on the derived length of the region of interest.

6. The image processing apparatus according to claim 1, wherein the subject is a breast, and the radiography apparatus is a mammography apparatus.

7. The image processing apparatus according to claim 1, wherein the image processing comprises at least one of gradation enhancement processing or frequency enhancement processing.

8. An image processing method executed by a computer, the method comprising:

acquiring a low-energy image captured by a radiography apparatus by emitting radiation having first energy to a subject into which a contrast medium has been injected, and a high-energy image captured by the radiography apparatus by emitting radiation having second energy higher than the first energy to the subject into which the contrast medium has been injected;

generating a difference image showing a difference between the low-energy image and the high-energy image;

performing image processing of enhancing the contrast medium shown in the difference image; and displaying the difference image after the image processing and contrast amount information about a contrast amount of a difference image before the image processing, wherein the contrast amount information is a heat map of the contrast amount, and the method further comprises displaying the heat map in a manner being superimposed on the difference image after the image processing.

9. A non-transitory storage medium storing a program causing a computer to execute an image processing, the image processing comprising:

acquiring a low-energy image captured by a radiography apparatus by emitting radiation having first energy to a subject into which a contrast medium has been injected, and a high-energy image captured by the radiography apparatus by emitting radiation having second energy higher than the first energy to the subject into which the contrast medium has been injected;

generating a difference image showing a difference between the low-energy image and the high-energy image;

performing image processing of enhancing the contrast medium shown in the difference image; and displaying the difference image after the image processing and contrast amount information about a contrast amount of a difference image before the image processing, wherein the contrast amount information is a heat map of the contrast amount, and the image processing further comprises displaying the heat map in a manner being superimposed on the difference image after the image processing.

* * * * *